US006506430B1

(12) United States Patent
Zimlich, III et al.

(10) Patent No.: US 6,506,430 B1
(45) Date of Patent: *Jan. 14, 2003

(54) OAK AGED ALCOHOLIC BEVERAGE EXTRACT AND ACCELERATED WHISKY MATURATION METHOD

(75) Inventors: Joseph A. Zimlich, III; William T. Effler, both of Louisville, KY (US)

(73) Assignee: Brown-Forman Corporation, Louisville, KY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 106 days.

This patent is subject to a terminal disclaimer.

(21) Appl. No.: 08/678,862

(22) Filed: Jul. 12, 1996

Related U.S. Application Data

(63) Continuation-in-part of application No. 08/638,654, filed on Apr. 29, 1996, which is a continuation-in-part of application No. 08/505,457, filed on Jul. 21, 1995, now Pat. No. 6,132,788.

(51) Int. Cl.⁷ .............................. C12G 3/07; C12G 3/08
(52) U.S. Cl. .................... 426/330.4; 426/424; 426/387; 426/427; 426/429; 426/490
(58) Field of Search .............................. 426/330.4, 424, 426/427, 429, 490, 386, 387, 590, 592, 655

(56) References Cited

U.S. PATENT DOCUMENTS

| | | | |
|---|---|---|---|
| 92,640 A | | 7/1869 | Parsons |
| 161,642 A | | 4/1875 | Spier |
| 818,478 A | | 4/1906 | Schwayder |
| 1,264,564 A | * | 4/1918 | Russell ........................ 426/387 |
| 1,265,838 A | | 5/1918 | von Glahn |
| 1,908,407 A | * | 5/1933 | Coupeau et al. ............ 426/387 |
| 1,976,091 A | | 10/1934 | Pritchett |
| 1,981,873 A | * | 11/1934 | Miller ........................ 426/520 |
| 2,027,099 A | | 1/1936 | Hochwalt et al. |
| 2,055,060 A | | 9/1936 | Barker |
| 2,070,794 A | | 2/1937 | Krebs et al. |
| 2,086,080 A | | 7/1937 | Herrick |
| 2,092,866 A | | 9/1937 | Wisniewski |
| 2,132,435 A | | 10/1938 | Reiman .......................... 99/48 |
| 2,145,243 A | | 1/1939 | Bagby |
| 2,807,547 A | | 9/1957 | Nickol ............................ 99/48 |
| 2,859,117 A | | 11/1958 | Braus et al. |
| 2,991,180 A | * | 7/1961 | Faure .......................... 426/592 |
| 3,222,180 A | * | 12/1965 | Sucietto ....................... 426/422 |
| 3,619,205 A | | 11/1971 | LeVan |
| 3,826,829 A | | 7/1974 | Marulich |
| 3,843,809 A | | 10/1974 | Luck |
| 3,897,571 A | | 7/1975 | Homler et al. |

(List continued on next page.)

FOREIGN PATENT DOCUMENTS

| | | | |
|---|---|---|---|
| AU | 083064 | * | 1/1977 |
| DE | 3024055 | | 1/1982 |
| DE | 3410717 | A1 | 10/1985 |
| EP | 0 062 799 | | 10/1982 |
| EP | 0 077 745 | | 4/1983 |
| EP | 0487268 | A1 | 5/1992 |
| EP | 634108 | A2 | 1/1995 |
| GB | 6770 | * | of 1906 |
| GB | 500081 | | 2/1939 |
| GB | 1199558 | | 7/1970 |
| GB | 1331518 | | 9/1973 |
| GB | 2027447 | * | 7/1978 |
| JP | 1-157372 | | 6/1989 |
| JP | 1165365 | | 6/1989 |
| SU | 122122 | | 10/1958 |
| SU | 215185 | | 4/1968 |
| SU | 891770 | | 12/1981 |
| SU | 1196373 | | 12/1985 |
| SU | 1663022 | | 7/1991 |

OTHER PUBLICATIONS

Abstract of SU 721486, Avakov et al, Mar. 1983.*
Abstract of SU 950765, Gorbatyuk et al, Aug. 1980.*
Abstract of JP 57099187, Sato, Jun. 1982.*
Abstract of JP 87004112 Sato Dec. 1987.*
Filtration and Separation, Anon., Sheet Filtration 29(1), 39–40, 1992.*
H.J. Grossman, Grossman's Guide to Wines, Beers, and Spirits, 6th Ed., Charles Scribner's Sons, New York, 1977, pp. 311–320.*
Concise Encyclopedia Chemistry, Walter de Gruyter, Berlin•New York 1994 pp. 777–778.*
Ch. Abstract 3582h of M.B. Jacobs "Oxidative Aging of Whisky", *Am. Perfumer* 49, 263–5 (1947).

(List continued on next page.)

*Primary Examiner*—Curtis E. Sherrer
(74) *Attorney, Agent, or Firm*—McDermott, Will & Emery

(57) ABSTRACT

An extract of an oak aged alcoholic product is produced by a process using a food grade solvent or a process which does not use a food grade solvent. The process using a good grade solvent includes adding a food grade solvent, such as ethyl acetate, to the oak aged alcoholic product and mixing the two liquids. The resulting mixture is allowed to separate into two layers. A first layer, including the food grade solvent, flavors, color, alcohol (i.e., ethanol) and water, is separated from the second layer, and the solvent is removed. In the process which does not use a food grade solvent, the oak aged alcoholic product has at least some of its wood notes and color removed to produce an intermediate product. Substantially all water and alcohol is then removed from the intermediate product. In another process for producing the extract without a food grade solvent an intermediate proof-adjusting step is added after the step of removing the wood notes and color and before the step of removing the water and alcohol. The extract can be added to a less costly alcoholic beverage, such as grain neutral spirits, or sugar beet spirits, to produce a beverage having the taste of a mature oak aged alcoholic beverage.

11 Claims, 3 Drawing Sheets

U.S. PATENT DOCUMENTS

| | | | |
|---|---|---|---|
| 4,069,351 A | | 1/1978 | Yano et al. |
| 4,216,268 A | | 8/1980 | Stillman |
| 4,251,668 A | * | 2/1981 | Leaute .......................... 560/69 |
| 4,284,672 A | | 8/1981 | Stillman |
| 4,309,466 A | | 1/1982 | Stillman |
| 4,405,667 A | | 9/1983 | Christensen et al. |
| 4,499,117 A | | 2/1985 | Bonneau |
| 4,501,798 A | | 2/1985 | Koschak et al. |
| 4,738,857 A | | 4/1988 | Daher et al. |
| 4,778,688 A | | 10/1988 | Matson |
| 4,790,999 A | | 12/1988 | Ashmont et al. |
| 4,877,635 A | | 10/1989 | Todd, Jr. |
| 4,956,194 A | * | 9/1990 | Gos ........................... 426/592 |
| 4,990,350 A | | 2/1991 | Rohmann |
| 5,034,238 A | * | 7/1991 | Seidlitz et al. ............ 426/330.4 |
| 5,066,509 A | | 11/1991 | van den Hoven et al. |
| 5,250,334 A | | 10/1993 | Lutterotti |
| 5,356,641 A | | 10/1994 | Bowen et al. |
| 6,132,788 A | * | 10/2000 | Zimlich, III ................. 426/424 |

OTHER PUBLICATIONS

Ch. Abstract 6082e of H. Aich, "Ripening of alcoholic beverages, especially of brandies", Hung. 135,672, (1949).

Ch. Abstract 11782e of V. Zigori, "Accelerated aging of brandies for production of natural brandy," *Bul. Shkencave Natyr., Univ. Sheteteror Tiranes* 27(12), 97–109 (Albanian) (1973).

Ch. Abstract 84475n of J. Tamchyna, "Continuous artificial maturing of spirits," Czech. 150,340 (Cl. C12h), Sep. 15, 1973, App. 643/71, Jan. 29, 1971; 3 pp. Addn. to Czech. 146,438 (CA 78:122663z).

Ch. Abstract 39129r of E. L. Mndzhoyan, "New way of treating oak for brandy production," *Dokl. Akad. Nauk Arm. SSR* 1977, 65(1), 46–51 (Russ).

Ch. Abstract 134870j of E. L. Mndzhoyan, "Brandy spirit aging accelerant made from oakwood," U.S.S.R. 591,504 (Cl. C12H1/22), Feb. 5, 1978, App. 2,313,536, Jan. 9, 1976, *Otkrytiya, Izobret., Prom. Obraztsy, Tovarnye Znaki,* 1978, 55(5), 3.

Ch. Abstract 22256c of E. L. Mndzhoyan, "Treatment of oak wood for brandy production," *Vinodel. Vinograd. SSSR* 1978, (1), 15–18 (Russ).

Ch. Abstract 85216f of J. Tamchyna, "Accelerated aging of distillates," *Kvasny Prum.* 1978, 24(10), 232–4 (Slo).

Ch. Abstract 130515c of A. Popa, "Increased use of non-commercial grape production by rapidly ageing wine distillates," *An. Univ. Craiova, [Ser]: Biol., Agron., Hortic.* 1977, 8(18), 169–75 (Rom.).

Ch. Abstract 141204p of Kliman et al., "Artificial aging of alcoholic drinks," (Cl. C12H1/12), Sep. 30, 1981, Appl. 76/5,055, Aug. 3, 1976; 4 pp.

Ch. Abstract 32980j of Semenenko et al., "Improvement of the brandy maturing process," *Sadovod. Vinograd. Vinodel. Mold.* 1982, 37(10), 29–31 (Russ).

Ch. Abstract 36109b of J. A. Maga, "Flavor contribution of wood in alcoholic beverages," *Dev. Food Sci.* 1985, 10(Prog. Flavour Res.), 409–16 (Eng.).

Ch. Abstract 224604z of Gubiev et al., "Accelerated aging of distilled alcoholic beverages," Fr. Demande FR 2,570,080 (Ct. C12H1/22), Mar. 14, 1986, Appl. 84/13802, Sep. 7, 1984; 11 pp.

Ch. Abstract 152875e of Lyubchenkov et al., "Enrichment of brandy spirits with extractive substances of oak wood in a continuous flow system," *Otkrytiya, Izobret.* 1987, (7), 122.

Ch. Abstract 234741x of Vazquez et al., "Accelerated aging of rums," *Sobre Deriv. Cana Azucar*, 1987, 21(1), 19–22 (Span).

Ch. Abstract 230106h of V. Lichev, "Influence of oxidation processes on the development of the taste and flavor of wine distillates," *Am. J. Enol. Vitic.*, 1989, 40(1) 31– (Eng.).

Ch. Abstract 230685s of Mndzhoyan et al., "Method of producing from oakwood an accelerating agent for maturing brandy spirits," U.S.S.R. SU 1,472,489 (Cl. C12H1/22), Apr. 15, 1989, Appl. 4,183,861, Jan. 21, 1987, *Otkrytiya, Izobret*, 1989 (14), 115.

Ch. Abstract 80026y of Chatonnet et al., Effect of heat on oak wood and its chemical composition. Part 2. Variations of certain compounds in relation to burning intensity. *Connaiss. Vigne Vin*, 1989, 23(4), 223–50 (Fr).

Ch. Abstract 62234m of Lipis et al., "Extraction of volatile substances from liquid foods of vegetable origin," Tr. Mold. *Nauch.–Issled. Inst. Pishch. Prom.*, 1970, No. 10, 38–44 (Russ).

Ch. Abstract 127764v of C. Jarraud, "Extract for improvement and aging of spirits," Fr. Demande 2,356,722, Jan. 27, 1978, Appl. 76/20,162, Jul. 1, 1976; 6 pp.

Ch. Abstract 101953b of R. Leaute, "Substance for use in the manufacture or subsequent treatment of alcholic liquids," Ger. Offen. 2 829,964 (Cl. C12G3/06) Jan. 25, 1979, Lux Appl. 77,707, Jul. 7, 1977; 19 pp.

Ch. Abstract 196771x of Marinov et al., "Lignin in oak wood, brandy distillate, and oak extract," *Nauchni Tr., Vissh Inst. Khranit. Vkusova Prom–st., Plovdiv*, 1980 (Pub. 1981), 27(2), 55–66 (Bulg).

Ch. Abstract 20865h of Bozhinov et al., "Oak extract in the aging of wine distillates," *Lozar. Vinar.*, 1983, 32(2), 21–4 (Bulg.).

Ch. Abstract 73802w of Ackermann et al., "Simplified method for imparting smoky flavor to alcoholic beverages," Ger. (East) DD 245,900 (Cl. C12G3/06) May 20, 1987, Appl. 286,396, Jan. 22, 1986; 2 pp.

Ch. Abstract 40138w of Sato et al., "Preparation of condensed wine to be used for cooking," Jpn. Kokai Tokkyo Koho JP 03,240,462 [91,240,462] (Cl. A23L1/23) Oct. 25, 1991, Appl. 90–37,351, Feb. 20, 1990; 7 pp.

Ch. Abstract 254018j of Pino et al., "Comparison of extraction methods for the isolation of volatile compounds from distilled alcoholic beverages," *Nahrung*, 1994, 38(3), 307–10 (Eng.).

Ch. Abstract 264124a of Langguth et al., "Composition and production of alcoholic beverages with brandy–like flavor," Ger. Offen. DE 4,331,437 (Cl. C12G3/04) Mar. 23, 1995, Appl. Sep. 13, 1993, 3 pp.

\* cited by examiner

OAK AGED ALCOHOLIC BEVERAGE EXTRACT AND ACCELERATED WHISKY MATURATION METHOD

CROSS-REFERENCE TO RELATED APPLICATIONS

This is a continuation-in-part of co-pending application Ser. No. 08/638,654, filed on Apr. 29, 1996, entitled OAK AGED ALCOHOLIC BEVERAGE AND ACCELERATED WHISKY MATURATION METHOD, which was a continuation-in-part of Ser. No. 08/505,457, filed on Jul. 21, 1995, now U.S. Pat. No. 6,132,788, entitled OAK AGED ALCOHOLIC BEVERAGE EXTRACT, now U.S. Pat. No. 6,132,788, issued Oct. 17, 2000.

BACKGROUND OF THE INVENTION

1. Field of the Invention

The invention is directed to a process for producing an extract of oak aged alcoholic products, e.g., a mature oak aged alcoholic beverage or accelerated oak aged alcoholic products, and to the product of such a process. The invention is also directed to accelerated oak aged alcoholic products and to a method of producing thereof.

2. Discussion of Related Art

Typically and traditionally, the production of mature oak aged alcoholic beverages suitable for human consumption, such as whisky, bourbon, scotch, rum or tequila, includes the steps of fermentation, distillation, e.g., in a still, and then aging in oak barrels at natural ambient conditions for a suitable period of time, e.g., 3 to 8 years or longer.

When mature oak aged alcoholic beverages are exported to foreign countries, substantial transportation costs are incurred because of the cost of transporting 50–60% of water and 40–50% ethanol. Furthermore, substantial excise tax is also paid for the exportation of such alcoholic beverages due to their high alcoholic content.

Attempts have been made in the past to address some of the above problems. It has been attempted to produce, from less expensive alcoholic beverages, alcoholic beverages of superior taste, simulating that of mature oak aged alcoholic beverages. For example, several whisky flavors have been available on the market, offered by several flavor companies. These flavors contain natural and synthetic flavors which are then added back to a relatively inexpensive whisky or other sources of inexpensive alcohol to enhance the whisky flavor thereof. However, such flavors, generally speaking, fall short of being able to provide a relatively inexpensive whisky or spirit with the flavor characteristics of a mature oak aged alcoholic beverage.

Thus, a need still exists for an extract of oak aged alcoholic products which can be added to a less expensive alcoholic beverage, such as grain neutral spirits or cane neutral spirits, to produce an alcoholic beverage having substantially the same taste and other characteristics as a mature oak aged alcoholic beverage.

SUMMARY OF THE INVENTION

It is one object of the present invention to provide an extract made from a mature oak aged alcoholic beverage which can be added to a less costly alcoholic beverage (than the mature oak aged alcoholic beverage or an accelerated oak aged alcoholic beverage) to produce an alcoholic beverage having substantially the same flavor and other characteristics as the mature oak aged alcoholic beverage.

It is another object of the present invention to provide a process to make accelerated oak aged alcoholic products which are less costly to produce than the mature oak aged alcoholic beverage. The accelerated oak aged alcoholic products may be either an accelerated oak aged alcoholic beverage or an accelerated oak aged alcoholic concentrate. The accelerated oak aged alcoholic beverage has substantially the same flavor and other characteristics as the mature oak aged alcoholic beverage.

It is another object of the present invention to provide an extract made from an accelerated oak aged alcoholic product which can be added to a less costly alcoholic beverage (than the mature oak aged alcoholic beverage or an accelerated oak aged alcoholic beverage) to produce an alcoholic beverage having substantially the same flavor and other characteristics as the mature oak aged alcoholic beverage.

The less costly alcoholic beverage can be grain neutral spirits, sugar beet neutral spirits, sugar cane neutral spirits, or any neutral spirits of a fermented and distilled natural product, a mixture thereof, or similar beverages.

The term "any neutral spirits of a fermented and distilled natural product" as will be apparent to those skilled in the art, refers to a product which can be made from any fermented and distilled natural carbohydrate material to produce neutral spirits, as defined in 27 C.F.R. §5.22, incorporated herein by reference. For example, suitable neutral spirits of a fermented and distilled natural product include neutral spirits made from brandy, neutral spirits made from a fermented whey product and neutral spirits made from similar fermented and distilled natural products.

One embodiment of the invention is directed to processes of producing an extract of a mature oak aged alcoholic beverage ("extract-producing processes"). A first extract-producing process utilizes a food grade solvent and a second extract-producing process does not utilize a food grade solvent. The first extract-producing process comprises adding a food grade solvent to the mature oak aged alcoholic beverage and mixing, preferably thoroughly mixing, to produce a mixture of the solvent and the mature oak aged alcoholic beverage. Subsequently, a first layer comprising the food grade solvent, flavors, color, alcohol and a small amount of water, is allowed to separate from a second layer. Then, the first layer is substantially separated from the second layer. The second layer comprises water, residual flavors, residual food grade solvent and alcohol. Subsequently, the food grade solvent is substantially removed from the first layer to produce the extract. At least some of the alcohol may also be removed with the food grade solvent from the first layer. The extract comprises the flavors and the color. The extract may also include other ingredients, such as the food grade solvent, alcohol and a small amount of water.

Another embodiment of the invention is directed to an extract of a mature oak aged alcoholic beverage produced by a process of the invention. The extract is produced by the first extract-producing process or the second extract-producing process. In the first extract-producing process, the extract is produced by adding a food grade solvent to the mature oak aged alcoholic beverage and mixing, preferably thoroughly mixing, to produce a mixture of the solvent and the mature oak aged alcoholic beverage. Subsequently, a first layer comprising the food grade solvent, flavors, color, alcohol, and a small amount of water, is allowed to separate from a second layer. In the next step, the first layer is substantially separated from the second layer. The second layer comprises water, residual flavors, residual food grade solvent and alcohol. Finally, the food grade solvent is substantially removed from the first layer to produce the extract. At least some of the alcohol may also be removed from the first layer with the food grade solvent. Thus, the extract comprises the flavors and the color. The extract may also include other ingredients, such as the food grade solvent and alcohol, and a small amount of water.

Yet another embodiment of the invention is directed to an accelerated whisky maturation method (or an "accelerated oak aged alcoholic products maturation method") comprising combining an alcoholic distillate with toasted oak chips to provide a mixture of the alcoholic distillate and the toasted oak chips, heating and oxygenating and/or aerating the mixture for about 5–about 40 days, and removing the oak chips.

An additional embodiment of the invention is directed to processes for producing an extract of an accelerated oak aged alcoholic product, made by the accelerated whisky maturation method. The first extract-producing process utilizes a food grade solvent and a second extract-producing process does not utilize a food grade solvent. The first extract-producing process comprises adding a food grade solvent to the accelerated oak aged alcoholic product and mixing the ingredients to produce a mixture of the solvent and the accelerated oak aged alcoholic product. A first layer, comprising the food grade solvent, flavors, color, alcohol, and a small amount of water, is allowed to separate from a second layer (comprising water, residual flavors, residual food grade solvent and alcohol), and the first layer is substantially separated from the second layer. Then, the food grade solvent is substantially removed from the first layer to produce the extract. At least some of the alcohol from the first layer may also be removed with the food grade solvent. The extract comprises the flavors and the color, but it may also include other ingredients, such as the food grade solvent and alcohol and a small amount of water.

Another embodiment of the invention is directed to an accelerated oak aged alcoholic product produced by a method comprising combining an alcoholic distillate with toasted oak chips to provide a mixture of the alcoholic distillate and the toasted oak chips, heating and oxygenating and/or aerating the mixture for about 5–about 40 days, and removing the oak chips.

Yet another additional embodiment is directed to an extract of an accelerated oak aged alcoholic product. The extract is produced by a first extract-producing process utilizing a food grade solvent or by a second extract-producing process which does utilize a food grade solvent. The first extract producing process comprises adding a food grade solvent to the accelerated oak aged alcoholic product and mixing the ingredients to produce a mixture of the solvent and the accelerated oak aged alcoholic product. A first layer comprising the food grade solvent, flavors, color, alcohol, and a small amount of water, is allowed to separate from a second layer. The first layer is then substantially separated from the second layer, which comprises water, residual flavors, residual food grade solvent and alcohol. Subsequently, the food grade solvent is substantially removed from the first layer to produce the extract. At least some of the alcohol may also be removed from the first layer with the food grade solvent. The extract thus comprises the flavors and color. The extract may also include other ingredients, such as the food grade solvent and alcohol and a small amount of water.

The second extract-producing process includes a first sub-embodiment and a second sub-embodiment. The first and the second sub-embodiments can be used to make an extract from an oak aged alcoholic product, which may include a mature oak aged alcoholic beverage and an accelerated oak aged alcoholic product.

The following summary of the first and second sub-embodiments with the oak aged alcoholic product is equally applicable to the use of these sub-embodiments with the mature oak aged alcoholic beverage or any of the accelerated oak aged alcoholic product or products.

The first sub-embodiment comprises a process for producing an extract of an oak aged alcoholic product which has a proof of about 80 to about 120, and which includes water, alcohol, color, flavors and wood notes. This process comprises:

(i) removing from the oak aged alcoholic product at least some of the wood notes and color to produce an intermediate product;

(ii) substantially removing from the intermediate product water and alcohol to produce the extract.

The second sub-embodiment comprises a process for producing an extract of an oak aged alcoholic product which has a proof of about 80 to about 120, and which includes water, alcohol, color, flavors and wood notes. This process comprises:

(i) removing from the oak aged alcoholic product at least some of the wood notes and color to produce an intermediate product;

(ii) adjusting proof of the intermediate product to about 50–about 120°; and (iii) substantially removing from the intermediate product water and alcohol to product the extract.

The process and product of the invention directed to the extract and its production provide significant advantages. The extract has substantially cheaper transportation costs than the mature oak aged alcoholic beverage. Furthermore, the extract is not likely to be subjected to excessive excise taxes normally charged upon importation of oak aged alcoholic products, such as mature oak aged alcoholic beverages. As a result, the extract can be economically imported into many different foreign countries where it can be added to the specific country's predominant spirit, to produce alcoholic beverages having substantially the same taste and other characteristics as the mature oak aged alcoholic beverages.

The accelerated whisky maturation method of the invention and the product(s) thereof also provide significant advantages. They provide a relatively inexpensive method of aging whisky without losses usually associated with conventional methods of aging whisky, and without tying up financial resources in inventory.

DESCRIPTION OF PREFERRED EMBODIMENTS

Figure 1:
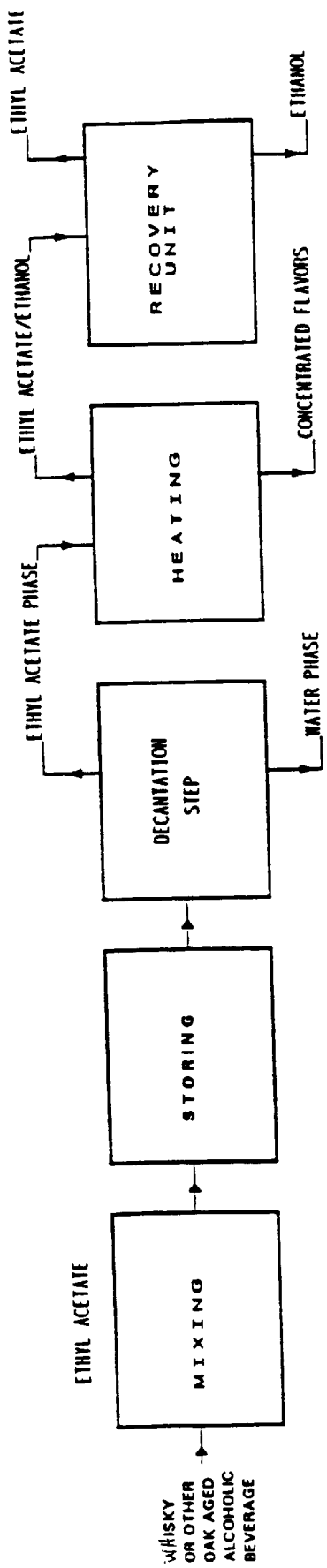
FIG. 1 is a schematic representation of the first extract-producing process, utilizing a food grade solvent producing an extract of an oak aged alcoholic product or products.
Figure 2:
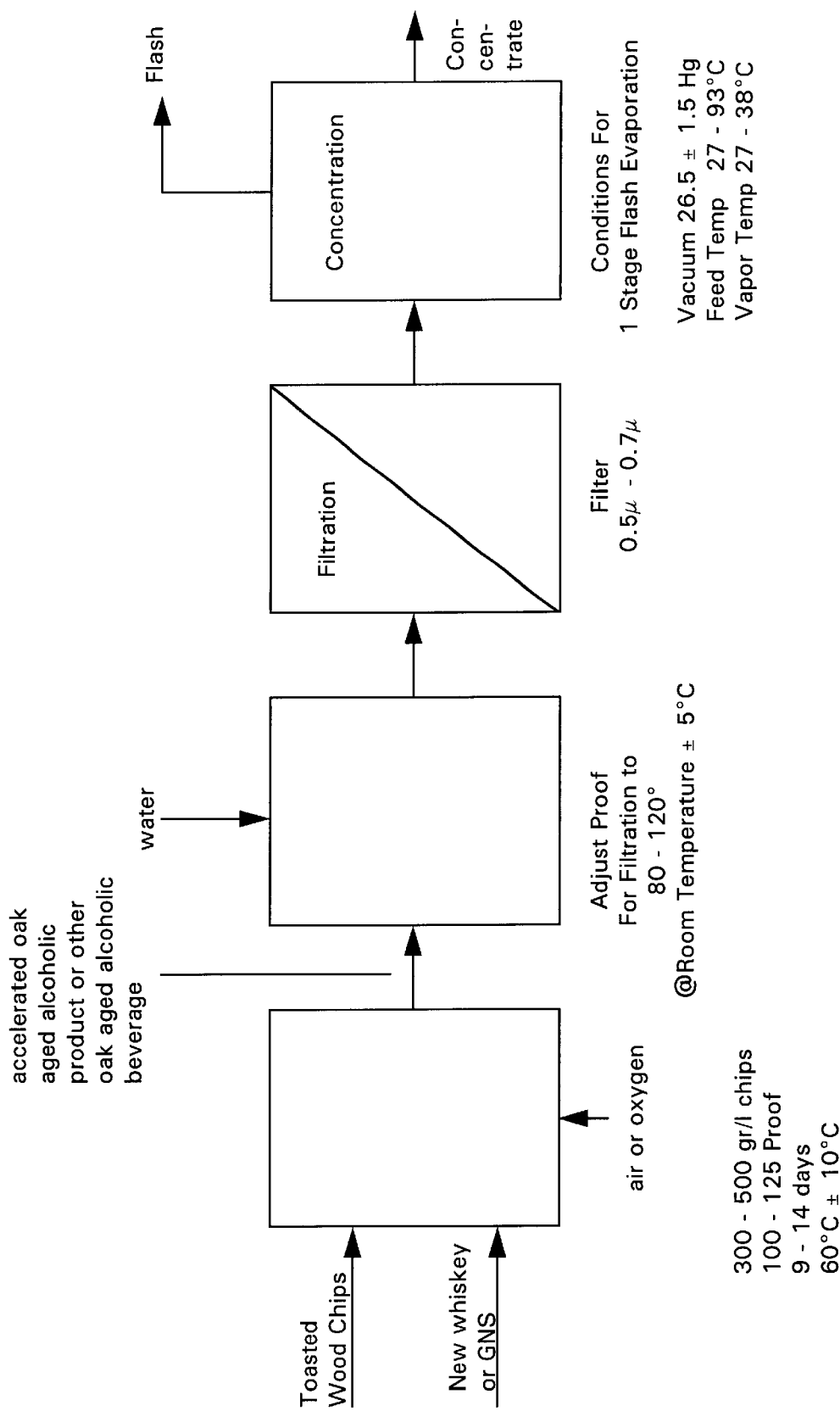
FIG. 2 is a schematic representation of the first sub-embodiment of the second extract-producing process, which does not use a food grade solvent.
Figure 3:
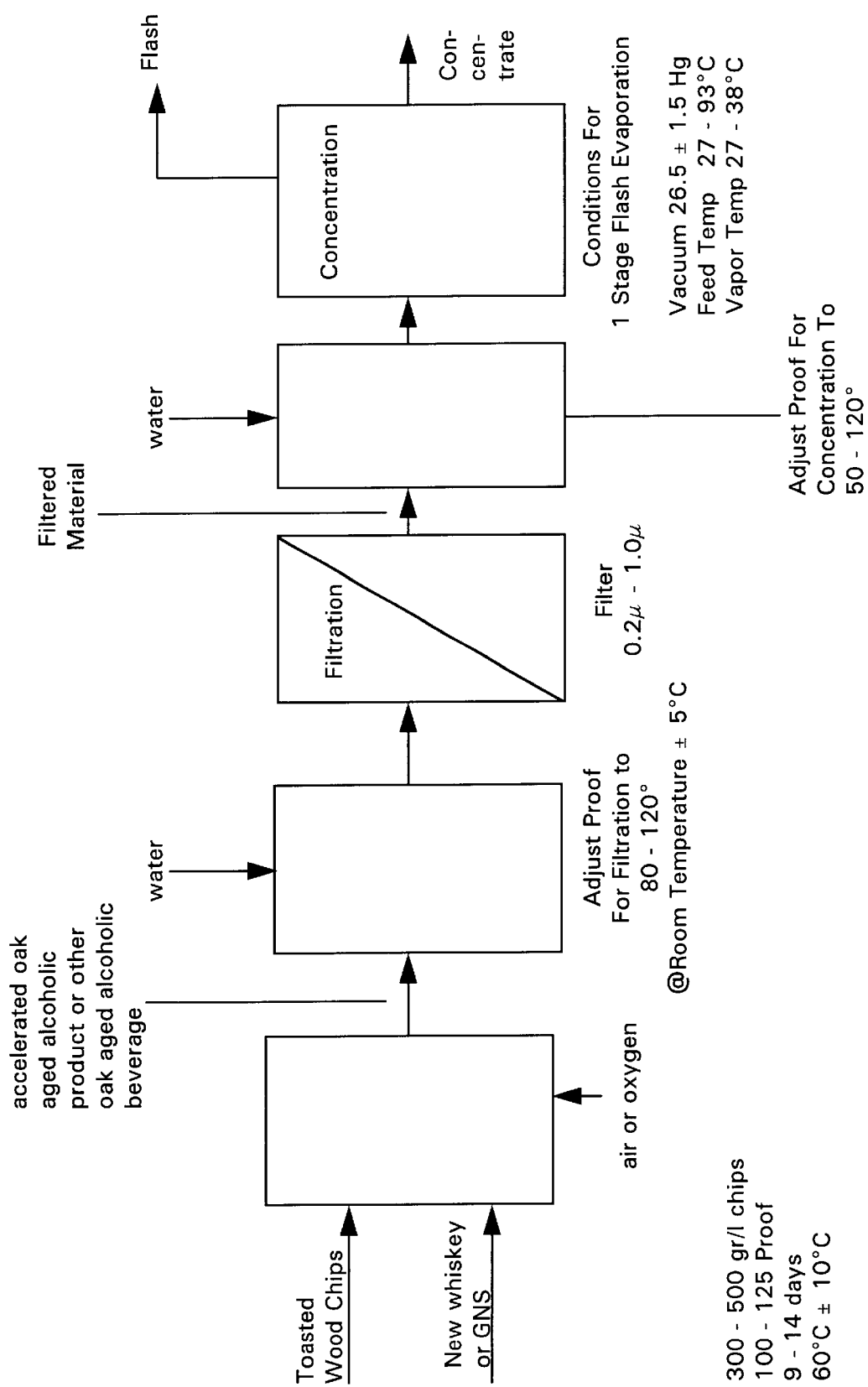
FIG. 3 is a schematic representation of the second sub-embodiment of the second extract-producing process, which does not use a food grade solvent.

The term "oak aged alcoholic product or products" includes a "mature oak aged alcoholic beverage" and an "accelerated oak aged alcoholic product or products". All references to singular nouns, such as "product" or "beverage", are intended herein to encompass the plural forms thereof. All references to plural nouns are intended to encompass singular forms thereof.

The term "mature oak aged alcoholic beverage" may include any oak aged alcoholic beverage, suitable for human consumption, which has aged in a traditional (or conventional) aging process (or method) in the presence of oak, e.g., in oak barrels, and matured, as defined by an expert taste panel. Such a conventional aging process usually takes a number of years, e.g., 3 to 8 years or longer. Examples of such mature oak aged alcoholic beverages include bourbon, scotch, whisky, rum, tequila, and oak aged wines, such as cabernet and chardonnay. Such a beverage may also be referred to herein as a "mature traditional oak aged alcoholic beverage".

The term "maturation" or "maturation process" is related to the traditional process for aging alcoholic beverages, i.e., in a charred oak barrel (new or used), for a period of time to make a mature oak aged alcoholic beverage suitable for human consumption.

The term "accelerated whisky maturation method" is related to simulating the same chemical reactions and extractions which take place in the maturation process, only in a shorter time using heat, toasted wood chips and air and/or oxygen.

The term "accelerated oak aged alcoholic products" may include: (1) the accelerated oak aged alcoholic beverage; or (2) the accelerated oak aged alcoholic concentrate, both produced by an accelerated whisky maturation method. When this method is used to produce the accelerated oak aged alcoholic beverage, it is intended to provide, at a relatively low cost, an alcoholic beverage having substantially the same taste and other characteristics as the mature oak aged alcoholic beverage (or beverages) produced by traditional aging methods, including aging of a beverage, such as a whisky aged in oak barrels. When this method is used to produce the accelerated oak aged alcoholic concentrate, it is intended to provide an alcoholic concentrate for the production of an extract. That extract may then be used to produce a reconstituted alcoholic beverage.

The accelerated whisky maturation method will be discussed initially, because it produces products (the "accelerated oak aged alcoholic products") which may be used as the starting material in the process for producing an extract.

In the accelerated whisky maturation method, any high proof alcoholic distillate is used. The terms "high proof alcoholic distillate" or "alcoholic distillate" (used interchangeably herein) designate a distillate produced from a distillation apparatus, such as a still, which has not been aged in the presence of oak wood. The alcoholic distillate has such alcohol (i.e., ethyl alcohol) content that the proof range of the alcoholic distillate ranges from about 80 to about 200°. Examples of suitable high proof alcoholic distillates are a whisky distillate and any neutral spirits. The neutral spirits has proof of about 190 to about 200° and is made from any natural material which is fermented and distilled to about 190 to about 200°. The proof range of the whisky distillate is about 80 to about 170°, preferably about 80 to about 160° and most preferably about 100 to about 140°. Before the alcoholic distillate (such as whisky distillate or neutral spirits) is used in the accelerated whisky maturation method, it is diluted with water or deionized water to the proof range of about 40 to about 125.

The accelerated whisky maturation method may be used to produce two different products: (1) an accelerated oak aged alcoholic beverage, or (2) an accelerated oak aged alcoholic concentrate. The accelerated oak aged alcoholic beverage is suitable for human consumption, after it is produced in this method without additional processing steps. The accelerated oak aged alcoholic concentrate is not suitable for human consumption as produced in the method, and it is produced primarily to be used as a starting material in the process for producing an extract. In the accelerated whisky maturation method, the alcoholic distillate is combined with toasted oak chips, the resulting mixture is heated and aerated and/or oxygenated for a period of about 5–about 40 days, preferably about 9–about 14 days, and the toasted oak chips are removed, to produce either one of the aforementioned products. Furthermore, if the method is used to produce the accelerated oak aged alcoholic beverage, the mixture may be heated and aerated and/or oxygenated for the aforementioned time period or for a time required to give color and flavor substantially similar to that of a mature oak aged alcoholic beverage. The aforementioned time periods are usually sufficient to give such a color and flavor. In one preferred embodiment, the mixture is held at 60° C. for nine days to produce either one of the aforementioned products. The mixture is then cooled to a suitable temperature, preferably substantially ambient temperature.

In the production of the accelerated oak aged alcoholic beverage, the relative proportion of the toasted oak chips added to the alcoholic distillate is about 15–about 100, preferably about 15–about 30, more preferably about 20–about 30 and most preferably about 25 gram chips per liter (g/L) of the alcoholic distillate (alcoholic proof about 40 to about 125). After the accelerated oak aged alcoholic beverage is produced, it may be reduced, if desired, to a proof level suitable for the beverage, such as 40–115 proof.

The accelerated oak aged alcoholic concentrate is produced by using more than about 100 (i.e., at least about 110)–about 500, preferably about 300–about 500, and most preferably about 300–about 400 g/L of chips.

Otherwise, the process conditions to make either the accelerated oak aged alcoholic beverage or the accelerated alcoholic concentrate are substantially the same.

The temperature to which the mixture of the oak chips and the alcoholic distillate is heated is about 40°–about 85° C., preferably about 50°–about 60° C., and most preferably about 60° C., and the aeration and/or oxygenation is conducted to maintain a level of at least about 10 milligrams per liter of dissolved oxygen, up to the point where the alcoholic distillate is saturated with oxygen. A preferable range is about 15 to about 45 milligrams per liter (mg/L) of dissolved oxygen. In one embodiment, the alcoholic distillate contains 25 milligrams per liter of dissolved oxygen. Without wishing to be bound by any operability theory, it is believed that oxygen plays an important part in creating vanillin. The amount of oxygen may be adjusted to lower or higher levels. After the aeration and/or oxygenation step is completed, the oak chips are removed from the mixture by any suitable method such as filtration, centrifugation, or screening.

The addition of about 0.3 to about 1.0 g/L of activated carbon to the mixture of the oak chips and the alcoholic distillate before the mixture is heated may be used to alter the flavor of the accelerated oak aged alcoholic products. The activated carbon used for that purpose has at least about 1,200 activation sites (i.e., surface area of at least about 1200 $m^2/g$). However, any activated carbon will work to varying degrees depending upon the number of activation sites. Suitable products can be prepared with or without carbon. Thus, the use of carbon depends on the flavor preference of the final product. Without wishing to be bound by any operability theory, it is believed that the altered flavor is due to an increase in the production of esters and aldehydes caused by the addition of the activated carbon.

An activated carbon may also be used to remove excess color from the accelerated oak aged alcoholic products or the mature oak aged alcoholic beverage. Preferably, excess color is not removed from the accelerated oak aged alcoholic concentrate. Such a carbon is used in the amount of about 0.1 to about 0.7 g/L, preferably about 0.2 to about 0.5 g/L, and most preferably about 0.3 g/L. Any activated carbon suitable for removing excess color can be used for that purpose. Such carbon preferably has at least about 800 activation sites. The activated carbon used to remove excess color is added to the accelerated oak aged alcoholic products or the mature oak aged alcoholic beverage after they are prepared.

The activated carbon used to alter flavor of the accelerated oak aged alcoholic products may be the same activated carbon which is used to remove excess color. In such an event, the activated carbon added to the mixture of the oak chips and the alcoholic distillate before the mixture is heated will also perform the function of removing excess color in the accelerated oak aged alcoholic products. Any activated carbon is removed from the accelerated oak aged alcoholic beverage, usually by filtration, prior to its consumption or prior to its further processing to produce an extract. If activated carbon is used to alter flavor of and/or remove excess color from the accelerated oak aged alcoholic concentrate, the activated carbon is removed prior to its further processing to produce an extract. The activated carbon is also removed from the mature oak aged alcoholic beverage prior to its consumption or further processing to produce an extract.

In one preferred embodiment, an accelerated oak aged alcoholic concentrate was produced by the accelerated whisky maturation method using whisky distillate (or new whisky), having proof of about 125. The whisky distillate was combined with 500 grams per liter of toasted oak chips, the resulting mixture was aerated daily for nine days and heated at a temperature of 50° C. The toasted oak chips were then removed by screening with a screen having an approximate 100 mesh size. The aeration was conducted to achieve oxygen level in the mixture of 45 mg $O_2$/L of the mixture. No activated carbon was used for this experiment. To the mixture was added 1 to 1.25 volumes of ethyl acetate and vigorously mixed for 1 hour, then allowed to set to separate. The top layer was removed and concentrated under vacuum (29 inches of mercury) to reduce the volume to 22% of original volume, thereby producing an extract of the accelerated oak aged alcoholic concentrate.

The flavor of the accelerated oak aged alcoholic beverage closely resembles that of the mature oak aged alcoholic beverage, such as mature whisky, which has been aged in a charred oak barrel for about 36 months or longer. In one particular embodiment, an accelerated oak aged alcoholic beverage having a very light whisky character was made in this method from an alcoholic distillate of 40 proof. The alcoholic distillate was combined with 25 g/L of medium toasted oak chips, the resulting mixture was oxygenated daily, once a day, for 15 minutes, for 9 days, and heated to 50° C., and the toasted oak chips were removed.

Any suitable oak wood pieces preferably from American or French white oak can be used to produce toasted oak chips. In one preferred embodiment, American oak chips were used which were obtained as a by-product of wooden barrel production by the Blue Grass Cooperage Company, Louisville, Ky. These chips were derived from the heartwood and not sap-wood of the white oak stave, which Blue Grass is using to make American white oak barrels.

The dimensions of the oak chips (also referred to herein as "chips"), prior to toasting, range from about 1 to about 4 mm in length, about 1 to about 2 mm in width and about 0.1 to about 0.5 mm in depth. Preferably, the ranges are about 3½ mm length, by about 2 mm in width and about 0.4 mm in depth. Chips of these characteristics can be obtained from any known method of chipping either oak staves or scraps of oak wood to provide the particular chip dimensions required for toasting.

It was found that toasting chips smaller than 1 mm by 1 mm by 0.1 mm may cause a fire in the toasting equipment, such as a toasting oven. In order to increase the desirable flavor components in the chips, the chips are toasted in the presence of hot air at about 204 to about 288° C., preferably about 240 to about 282° C., more preferably about 240 to about 271° C., and most preferably about 240 to about 250° C. The higher the temperature, the darker the color and more caramel flavor notes are produced. Toasting at higher temperatures may cause periodic flame-ups in the oven. The length of time of the toasting step ranges from about 1 to about 10 minutes, preferably from about 2 to about 10 minutes, and more preferably about 2 to about 5 minutes. Toasting of chips can be accomplished by any suitable means for raising surface temperature to that specified above, such as infrared heating, direct fire toasting or hot air toasting. Preferably the chips are toasted in a hot air fluidized bed. Other oxygen containing gases may also be used to toast the chips, providing that surface toasting of the chips would occur under the conditions described above.

In one embodiment, oak chips having length of about 3½ mm, width of about 2 mm and depth of about 0.4 mm are toasted at about 263° C. in a fluidized bed for about 3 minutes. In a preferred embodiment, oak chips having length of about 3½ mm, width of about 2 mm and depth of about 0.4 mm are toasted of 246° C. in a hot air fluidized bed for about 4 minutes.

The color of the toasted oak chips ranges from a very light toast to medium to a dark toast. A medium to dark toast is preferred.

The toasted chips can then be further processed if desired. They can be ground using any suitable grinder, such as a pin mill grinder, that would produce a uniform particle size of a minimum 30% on a USS 16 mesh screen and a maximum of 3% through a USS 60 mesh screen. Both the ground and unground products (i.e., toasted oak chips) perform equally well. The ground product (or material) is easier to clean up after the accelerated whisky maturation method is completed, whereas the large chips may occasionally bridge around the discharge opening where the chips are removed from the vessel used to make the accelerated oak aged alcoholic products, such as a tank.

Turning now to the process for producing an extract of an oak aged alcoholic product and a product of the process, this process can be conducted and the product obtained with separate processes: 1) a first extract-producing process, utilizing a food grade solvent; or 2) a second extract-producing process, which does not utilize a food grade solvent. The first extract-producing process will be described initially, and then the second extract-producing process. In the first extract-producing process, the food grade solvent is any solvent which is suitable and approved for use in conjunction with foods intended for human consumption. Examples of such suitable solvents are ethyl acetate, liquid carbon dioxide, and one or more components of fusel oil, preferably ethyl acetate. The term "fusel oil" designates a distilled concentrated liquid obtained in small amounts as a by-product of alcoholic fermentation and distillation, that consists of a mixture chiefly of alcohols, such as isopentyl, active amyl, isobutyl and normal propyl alcohols.

The term "less costly alcoholic beverage" means any alcoholic beverage suitable for human consumption which has not been aged conventionally in wooden white oak barrels, and includes such beverages as the grain neutral spirits ("GNS"), sugar beet neutral spirits, sugar cane neutral spirits, or any neutral spirits of a fermented and distilled natural product, similar beverages and mixtures thereof.

The term "substantially removed", as used in describing the removal of the food grade solvent from the first layer, means that substantially all of the solvent is removed, although some small amounts of the solvent might still remain.

In the initial step of the first extract-producing process for producing an extract of an oak aged alcoholic product, the food grade solvent is added to the oak aged alcoholic product in the proportion of about 1:1–about 5:1, preferably about 1:1–about 1.5:1 by volume. The oak aged alcoholic product used in this initial step can be a mature oak aged alcoholic beverage, an accelerated oak aged alcoholic product, or a mixture thereof. The accelerated oak aged alcoholic product may, of course, include the accelerated oak aged alcoholic beverage, the accelerated oak aged alcoholic concentrate, or a mixture thereof. The food grade solvent and the oak aged alcoholic product are mixed, preferably thoroughly mixed, so that the two liquids come into close, and preferably intimate, contact between substantially the entire volumes of both liquids. The mixing can be carried out by any means to provide such a contact, e.g., stirring on a stirplate, agitation, high speed dispersion or homogenization.

The resulting mixture is then stored at a temperature of about −9 to about 30° C., preferably about −1 to about 24° C., for about 1 to about 48 hours, preferably about 1 to about 20 hours. In one preferred embodiment, the mixture is stored at 20–25° C. for about 6 hours. During and after the storage, the mixture separates into a first layer and a second layer. The separation of the mixture is also referred to herein as a "phase separation", which is based on specific gravity differences between the first and the second layer. The separation of the two layers is very time and temperature dependent. For example, at −6° C. it takes approximately one hour for a substantially complete separation to occur. At a temperature of 30° C., the separation time is extended to 48 hours. As stated above, at higher temperatures the separation time is longer, while at lower temperatures it takes a very short time for the separation to occur.

The first layer, which is usually the top layer (or phase), comprises the food grade solvent, flavors, color, alcohol, i.e., ethanol, and a small amount of water. Some of the flavors constituents include fusel oil, oak lactones, tannins, color, vanillin, esters and aldehydes which are in the ethyl acetate phase if the latter is used as the solvent. The ranges of relative amounts of various ingredients in the first layer are: food grade solvent—about 70 to about 75% wt; alcohol—about 10 to about 25% wt; water—about 5 to about 20% wt; flavors and color (including vanillin)—about 0.5 to about 5% wt; vanillin about 0.5 to about 70 ppm. The second layer, usually the bottom layer (or phase), is mainly water and some alcohol, i.e., ethanol, and it may have minute quantities of the aforementioned original flavor compounds or constituents and residual amounts of the food grade solvent. The ranges of relative amounts of various ingredients in the second layer are: water—about 70 to about 80% wt; alcohol—about 15 to about 20% wt; food grade solvent—about 4 to about 7% wt; flavors and color—less than 100 ppm. The first layer is then substantially separated from the second layer by any suitable known method, such as decantation or centrifugation. The substantial separation of the first layer from the second layer is preferably conducted at the aforementioned storage temperature, i.e., about −9 to about 30° C., preferably about −1 to about 24° C., and in one preferred embodiment at 20–25° C. In the next step, also referred to herein as the "concentration step", the food grade solvent is substantially removed from the first layer by any known methods of removing a solvent from a liquid. Suitable methods include removing the solvent by evaporation, distillation, vacuum distillation, flash evaporation and thin film evaporation. A small amount of water and at least some alcohol may also be removed during this step. Preferably, the food grade solvent, such as ethyl acetate, is removed by evaporation under vacuum at 60° C. This can be done using any known technique for distillation or vacuum distillation. The substantial removal of the food grade solvent from the first layer produces the extract (also referred to herein as a "concentrate"). The extract comprises the flavor and the color. The extract may also include other ingredients, such as the food grade solvent, alcohol and a small amount of water. The ranges of relative amounts of various ingredients in the extract are: food grade solvent—about 0.005 to about 0.01% wt; alcohol—about 0.5 to about 5% wt; water about 95 to about 99% wt; flavors and color—about 0.01 to about 5% wt; vanillin—about 80 to about 130 ppm.

In one preferred embodiment of the first extract-producing process, the top layer, the bottom layer and the extract have the compositions set forth in Table A, wherein all amounts are in % wt, unless indicated otherwise.

TABLE A

| Layer or Extract | Ethyl Acetate | Ethanol | Water | Flavors Color (including Vanillin) | Vanillin |
|---|---|---|---|---|---|
| Top | 75 | 18 | 7 | 3 | 70 ppm. |
| Bottom | 6 | 17 | 77 | | |
| Extract | 0.008 | 0.06 | 95 | 5 | 100 ppm. |

The term "substantially separated", as used in describing the separation of the first layer from the second layer, means that substantially all of the first layer is removed from the second layer, although some insignificant, trace amounts of the first layer may be present in the second layer, and some insignificant, trace amounts of the second layer may be present in the first layer.

The second extract-producing process includes two sub-embodiments. In the first sub-embodiment, the process is conducted by removing from an oak aged alcoholic product at least some of the wood notes and color to produce an intermediate product and then conducting a concentration step. The oak aged alcoholic product used in the initial step of the first sub-embodiment of this second extract-producing process has proof of about 80 to about 120°, preferably about 90 to about 115°, and most preferably about 95 to about 110°. It will be apparent to those skilled in the art that if the oak aged alcoholic product has such an alcohol content that its proof is higher than that stated above, the alcohol content could be reduced to the desired level by suitable means, such as by adding water. The reduction in proof may be carried out at room temperature ±5° C. Without wishing to be bound by any operability theory, it is believed that using the oak aged alcoholic product having proof within the aforementioned ranges improves the ability of the step of removing the wood notes and color to remove most of the astringent wood notes. As a result, the extract produced in the process can be used to provide a reconstituted alcoholic beverage having substantially the same taste and other properties as a mature oak aged alcoholic beverage. The oak aged alcoholic product used in this initial step of the first sub-embodiment of the second extract-producing process can be a mature oak aged alcoholic beverage, an accelerated oak aged alcoholic product, or a mixture thereof. The accelerated oak aged alcoholic product may, of course, include the accelerated oak aged alcoholic beverage, the accelerated oak aged alcoholic concentrate, or a mixture thereof. The amount of the wood notes and color removed is such that the extract, when combined with a less costly alcoholic beverage, will produce a reconstituted alcoholic beverage having substantially the same taste and other characteristics as a mature oak aged alcoholic beverage. Those skilled in the art will be readily able to adjust the amount of the wood notes and color removed based on personal preference and the type of a reconstituted alcoholic beverage they wish to obtain. In general, the amount of the wood notes and color removed is about 5 to about 50% of the original content of the wood notes and color in the oak aged alcoholic beverage. The wood notes and color may be removed by any suitable means, such as filtration, or activated carbon treatment, preferably filtration. If filtration is used to remove the wood notes, it is conducted by passing the oak aged alcoholic product through a filter having the pore size from about 0.5 to about 0.7 microns. In one preferred embodiment, the filter has pore size of $0.5\mu$. In the next step, also referred to herein as the "concentration step", substantially all of the alcohol and water is removed from the intermediate product. Suitable methods include removing the alcohol and water by evaporation, distillation, vacuum distillation, flash evaporation, thin film evaporation and wipe film evaporation. Such an amount of alcohol and water is removed in this step that the remainder of the intermediate product, i.e., the extract, also referred to herein as a residue, comprises about 0 to about 40%, preferably about 0 to about 10%, and most preferably about 0 to about 5% wt. of alcohol. In one preferred embodiment, the residue comprises about 3% wt. alcohol. Preferably, the alcohol and water are removed by single stage flash evaporation under vacuum at 29° C. Other conditions of the single stage flash evaporation under vacuum include: vacuum, about 26.5±1.5 inches mercury; feed temperature, about 27–about 93° C.; and vapor temperature, about 27–about 38° C. This can be done by using any known technique and/or apparatus for distillation or vacuum distillation. The substantial removal of the water and alcohol from the intermediate product or the residue produces the extract (also referred to herein as a "concentrate"). The extract comprises flavor and color.

The term "substantially all of the alcohol and water is removed," from the intermediate product means that as much water and alcohol are removed as possible from the intermediate product by the chosen method. Nonetheless, some water and alcohol may remain in the extract. The extract may also include other ingredients, such as alcohol and water. The ranges of relative amounts of various ingredients in the extract are: alcohol—about 0–about 40% wt., preferably about 0–about 10% wt., more preferably about 0 to about 5% wt., and most preferably about 3% wt.; water—about 95 to about 99% wt.; flavors and color—about 0.01 to about 5% wt.; vanillin—about 80 to about 130 ppm. Some of the flavor constituents include fusel oil, oak lactones, tannins, color, vanillin, esters and aldehydes. If the extract comprises higher amounts of alcohol, e.g., higher than about 5%, the flavor balance may have to be adjusted by any known means, such as carbon treatment, described herein in connection with the production of accelerated oak aged alcoholic products.

In the second sub-embodiment of the second extract-producing process, the process is conducted by removing from an oak aged alcoholic product at least some of the wood notes and color to produce an intermediate product and then conducting additional steps, described below. The oak aged alcoholic product used in the initial step of this second sub-embodiment of the second extract-producing process has proof of about 80 to about 120°, preferably about 90 to about 115°, and most preferably about 95 to about 110°. It will be apparent to those skilled in the art that if the oak aged alcoholic product has such an alcohol content that its proof is higher than that stated above, the alcohol content could be reduced to the desired level by suitable means, such as by adding water. The reduction in proof may be carried out at room temperature ±5° C. Without wishing to be bound by any operability theory, it is believed that using the oak aged alcoholic product having proof within the aforementioned ranges improves the ability of the step of removing wood notes and color to remove most of the astringent wood notes. As a result, the extract produced in the process can be used to provide a reconstituted alcoholic beverage having substantially the same taste and other properties as a mature oak aged alcoholic beverage. The oak aged alcoholic product used in this initial step of the second sub-embodiment of the second extract-producing process can be a mature oak aged alcoholic beverage, an accelerated oak aged alcoholic product, or a mixture thereof. The accelerated oak aged alcoholic product may, of course, include the accelerated oak aged alcoholic beverage, the accelerated oak aged alcoholic concentrate, or a mixture thereof. The amount of the wood notes and color removed is such that the extract, when combined with a less costly alcoholic beverage, will produce a reconstituted alcoholic beverage having substantially the same taste and other characteristics as a mature oak aged alcoholic beverage. Those skilled in the art will be readily able to adjust the amount of the wood notes and color removed based on personal preference and the type of a reconstituted alcoholic beverage they wish to obtain. Generally, the amount of wood notes and color removed is about 5 to about 50% of the original content of the wood notes and color in the oak aged alcoholic product. The wood notes and color may be removed by any suitable means, such as filtration, or activated carbon treatment, preferably filtration. If filtration is used to remove the wood notes and color, it is conducted by passing the oak aged alcoholic product through a filter having pore size from about 0.2 to about 1.0, preferably about 0.4 to about 0.8, and most preferably about 0.5 to about 0.7 microns. In one preferred embodiment the filter has pore size of $0.5\mu$.

In a second step, proof of the intermediate product is adjusted to about 50–about 120, preferably about 55–about 110, more preferably about 58–about 110. In a third step, also referred to herein as the "concentration step", substantially all of the alcohol and water is removed from the intermediate product. Suitable methods include removing the alcohol and water by evaporation, distillation, vacuum distillation, flash evaporation, thin film evaporation and wipe film evaporation. Such an amount of alcohol and water is removed in this step that the remainder, also referred to herein as a "residue" or "extract", has about 0 to about 40%, preferably about 0 to about 10%, and most preferably about 0 to about 5% wt. of alcohol. In one preferred embodiment, the residue has about 3% wt. alcohol. Preferably, the alcohol and water are removed in a single stage flash evaporation under vacuum at 29° C. Other conditions of the single stage flash evaporation under vacuum include: vacuum, about 26.5±1.5 inches mercury; feed temperature, about 27–about 93° C.; and vapor temperature, about 27–about 38° C. This can be done using any known technique for distillation or vacuum distillation. The substantial removal of the water and alcohol from the intermediate product or the residue produces the extract (also referred to herein as "concentrate").

The term "substantially all of the alcohol and water is removed," from the intermediate product or "substantially removing from the intermediate product water and alcohol" means that as much water and alcohol are removed as possible from the intermediate product by the chosen method. Nonetheless, some water and alcohol may remain in the extract. The extract comprises the flavor and the color. The extract may also include other ingredients, such as alcohol and water. The ranges of relative amounts of various ingredients in the extract are: alcohol about 0–about 40% wt., preferably about 0–about 10% wt., more preferably about 0 to about 5% wt., and most preferably about 3% wt.; water—about 95 to about 99% wt.; flavors and color—about 0.01 to about 5% wt.; vanillin—about 80 to about 130 ppm. Some of the flavor constituents include fusel oil, oak lactones, tannins, color, vanillin, esters and aldehydes. If the extract comprises higher amounts of alcohol, e.g., higher than about 5%, the flavor balance may have to be adjusted by any known means, such as carbon treatment, described herein in connection with the production of accelerated oak aged alcoholic products.

In both sub-embodiments of the second extract producing process, if the accelerated oak aged alcoholic product is used as the oak aged alcoholic product, it preferably has proof of about 100–about 125°, it is made with about 300–about 500 g/l of oak chips, oxygenated for about 9–about 14 days, at about 60° C.±10° C.

In all processes of preparing the extract, if vacuum distillation is used, caution must be exercised to make certain that scorching of wood notes or flavor does not occur.

The extract may also comprise a mixture of the extract of the mature oak aged alcoholic beverage and of the extract of the accelerated oak aged alcoholic product or products. The mixture of the extract of the mature oak aged alcoholic beverage and of the accelerated oak aged alcoholic product or products may be obtained either by mixing two separately-produced extracts or by producing an extract from a mixture of the mature oak aged alcoholic beverage and the accelerated oak aged alcoholic product or products.

To produce an alcoholic beverage suitable for human consumption using the extract, the extract is added to any one or a combination of the aforementioned less costly alcoholic beverages. The amount of the extract used is about 1 to about 15%, preferably about 2 to about 10% and more preferably about 2 to about 5% by weight. The extract can be used in an amount which would produce an alcoholic beverage product for human consumption most suitable for each individual country's taste and preference.

Such an alcoholic beverage product may be referred to herein as a "reconstituted alcoholic beverage", "reconstituted whisky", "reconstituted accelerated oak aged alcoholic beverage" or "reconstituted mature oak aged alcoholic beverage", depending on the origin of the extract. Reconstituted whiskey preferably contains about 5 to 8 ppm of vanillin.

The term "alcoholic beverage suitable for human consumption" may be used interchangeably herein with the term "an alcoholic beverage product suitable for human consumption."

The extract may also be used as a flavoring in non-alcoholic or low alcohol content beverages and foods. The term "low alcohol content" means that the beverage or food includes not more than about 7% by weight of ethyl alcohol.

Treating the reconstituted alcoholic beverage with activated carbon may also render its taste characteristics more closely resembling those of the mature oak aged alcoholic beverages. The activated carbon used for this purpose is the same as described above for removing excess color from the accelerated oak aged alcoholic products or the mature oak aged alcoholic beverage. Such carbon preferably has at least about 800 activation sites. The amount of the activated carbon is the same as discussed above in connection with the discussion of the use of the activated carbon for removing excess color. Any activated carbon must be removed from the reconstituted alcoholic beverage before the reconstituted alcoholic beverage is used for human consumption. The carbon may be removed by any suitable means, such as those discussed above.

Furthermore, fusel oils may be added to the reconstituted alcoholic beverage to improve flavor. The fusel oils are added in the amount of about 10 to about 250 ppm, preferably about 200 ppm, and most preferably 200 ppm. Preferably, the fusel oils are added to the less costly alcoholic beverage before the proof of that less costly alcoholic beverage is reduced.

Ethyl acetate may be added to the less costly alcoholic beverage to obtain a desired flavor in the reconstituted alcoholic beverage.

As described in detail in the examples, when the extract was added to grain neutral spirits, the product was evaluated by a taste panel to be very similar to a whisky matured in a charred white oak barrel for 36–48 months.

As will be apparent to those skilled in the art, the accelerated whisky maturation method may be modified so that it is carried out with chips made from woods other than oak, such as hickory. Such modified process would be utilized to produce an accelerated wood aged alcoholic concentrate. The resulting accelerated wood aged alcoholic concentrate would be used to make an extract. The extract would be produced in a process for producing an extract, substantially similar to the process for producing an extract of an oak aged alcoholic product discussed above. The resulting extract of the accelerated wood aged alcoholic concentrate could be utilized to flavor alcoholic beverages and other food products, such as non-alcoholic or low alcohol content beverages and foods.

The following examples further illustrate the invention. It will be understood, however, that the examples are presented merely for the sake of illustration and do not limit the scope of the invention.

EXAMPLE 1

Purpose

To extract whisky flavors from a mature 4 year oak aged (new barrels) whisky using organic solvent extraction.

Methods and Materials

Materials 4 year old mature oak aged whisky at 82 proof Ethyl Acetate >99% purity and food grade.

Methods a.) Experiment #1

This experiment extracted flavors from 82 proof 4 year old mature oak aged whisky.

1. 380 g of 4 year old mature oak aged whisky was weighed out into a 2 liter beaker.
2. 380 g of ethyl acetate was added and the beaker was covered tightly with foil.
3. The contents were stirred for 30 minutes on a Corning® stirplate at #5 setting.
4. The beaker was removed from the stirrer plate, transferred and stored at −6 degree Celsius overnight.
5. The top solvent layer was removed as well as possible using decantation and pipettes. Samples of the top and bottom layers were collected to submit for analysis. Weights and analytical results are recorded in the following table.

Data for experiment #1: {Reported in ppm}

| Liquid Layer | Gallic Acid | HMF[a] | Furfural | Syr Ald[b] | Vanillin | Syr Acid[c] | Ell Acid[d] | Weight(g) |
|---|---|---|---|---|---|---|---|---|
| Top | 5.2 | 2.1 | 6.7 | 2.3 | 2.3 | 8.4 | 20.4 | 440 |
| Bottom | 2.0 | 1.1 | 1.3 | 0.8 | 0.6 | 2.9 | 6.3 | 295 |

[a]HMF = 5 (hydroxy methyl) 2 - furaldehyde
[b]Syr Ald = syringaldehyde
[c]Syr Acid = syringic acid
[d]Ell Acid = ellagic acid

EXAMPLE 2

This example involved using a portion of the solvent layer (top layer) from the extraction above (Example #1) to make a whisky flavor concentrate.

Top layer portion was concentrated by heating on a combination stir/hot plate until most of the ethyl acetate and alcohol (i.e., ethyl alcohol) appeared to have been evaporated into the atmosphere under a ventilation hood. The experiment started with approximately 275 g of material and it was concentrated to a volume of approximately 40 ml (40 g). This extract (or concentrated essence) was used in the following reconstitution in order to create a whisky/bourbon alcoholic beverage product.

To prepare the alcoholic beverage product, the following was used:

To 1 liter 80 proof of grain neutral spirits (GNS), 5% wt/wt of the concentrated essence from above was added to produce a reconstituted whisky. Next, 1 ml of an aldehyde essence prepared from a 4 year old aged whisky distillation was added to 1 L of the GNS (to provide flavor topnotes). The aldehyde essence was prepared by vacuum distilling 82 proof aged whisky as follows. The preparation of the aldehyde essence started with 12,215 ml (11,148 gr) of 4 year old whisky, which was heated to 35° C. under full vacuum (26.5 inches Hg). After 1–2 hours there was collected 216 grams of distilled and condensed material classified as aldehyde essence. The addition of the aldehyde essence to the reconstituted whisky is not necessary, but it may be utilized, depending on the desired final product.

500 ml portion of the above reconstituted whisky was split off to carbon treat it. 0.3 g/L of activated carbon from American Norit Co., Inc., Darco KB, was used for the treatment. This was stirred for 1 hour and allowed to settle overnight. The material was filtered through a paper filter pad to produce a carbon-treated finished product.

This sample of a carbon treated, reconstituted alcoholic beverage (i.e., reconstituted mature oak aged whisky) was evaluated by a whisky taste panel and was deemed acceptable as a 4 year old mature oak aged whisky.

EXAMPLE 3

This Example was used to arrive at parameters to use for optimum extractions. Two temperatures (20° F. and room temperature or "RT"), three solvent to whiskey volume ratios (1:1, 1.25:1, & 1.5:1.), and three partitioning times (2,6,20 hour) were examined.

1. 300 g of 4 year old mature oak aged whisky was weighed out into 1000 ml cylinders. The 2 hour study used the 82 proof while the other two used 86 proof whisky. Controls were submitted for each.
2. The contents of the cylinders were poured into 1000 ml glass separatory funnels. (2000 ml funnels had to be used for the 1.5:1 ratio study).
3. Ethyl acetate was weighed out into appropriate amounts, per ratios indicated above, and added to the separatory funnels.
4. The funnels were shaken for 3–5 minutes, vented after 30 seconds, to allow for sufficient mixing.
5. The funnels were allowed to set according to the proper time and temperature.
6. The top and bottom layers were decanted, weighed and submitted to analytical for analysis.

The following three tables give the amount of compounds extracted as well as the weights of the top and bottom layers.

TABLE 1

2 HOUR EXTRACTION

| SAMPLE | GALLIC ACID | HMF | FURFURAL | SYRINGIC ACID | VANILLIN | STR. ALDEN | ELL. ACID | TANNINS | START WT(g) | FIN. WT. |
|---|---|---|---|---|---|---|---|---|---|---|
| 1. PPM | | | | | | | | | | |
| 1:1 TOP RT* | 3 | 1.8 | 4.9 | 1.6 | 1.4 | 6.2 | 9 | 193 | 300 | 385 |
| 1:1 BOTTOM RT | 2.7 | 1.5 | 2.6 | 1.1 | 0.8 | 3.6 | 5.4 | 141 | 300 | 200 |
| 1.25:1 TOP RT | 3.4 | 1.7 | 4.9 | 1.7 | 1.6 | 6.1 | 8.7 | 192 | 375 | 495 |
| 1.25:1 BOTTOM RT | 2.4 | 1.3 | 1.7 | 0.8 | ND | 2.5 | 3.4 | 150 | 300 | 175 |
| 1.5:1 TOP RT | 2.6 | 1.5 | 4.3 | 1.5 | 1.4 | 5.9 | 6.3 | 145 | 450 | 575 |
| 1.5:1 BOTTOM RT | 2.4 | 1.1 | 1.4 | 0.6 | ND | 2.6 | 3.3 | 139 | 300 | 190 |
| 1:1 TOP COLD*** | 3.5 | 1.8 | 5.9 | 1.7 | 1.7 | 7.2 | 9.2 | 221 | 300 | 355 |
| 1:1 BOTTOM COLD | 2.2 | 1.4 | 1.8 | 0.7 | 0.5 | 2.6 | 3.1 | 125 | 300 | 245 |
| 1.25:1 TOP COLD | 3.2 | 1.8 | 5.3 | 1.9 | 1.7 | 6.5 | 8.7 | 213 | 375 | 470 |
| 1.25:1 BOTTOM COLD | 2 | 1.2 | 1.4 | 0.7 | 0.5 | 2.8 | 2 | 136 | 300 | 215 |
| 1.5:1 TOP COLD | 2.5 | 1.5 | 4.4 | 1.2 | 1.5 | 5.6 | 5.6 | 161 | 450 | 420 |
| 1.5:1 BOTTOM COLD | 1.6 | 0.9 | 0.9 | 0.4 | ND | 1.6 | 1.7 | 115 | 300 | 210 |
| 1.5:1 MIDDLE COLD | 2.6 | 1.5 | 4.2 | 1.4 | 1.3 | 5 | 5.2 | 169 | 0 | 95 |
| 82 PROOF CONTROL** | 7.2 | 3.6 | 9.1 | 3.7 | 3.3 | 13.1 | 15.5 | 448 | N/A | N/A |
| 2. WEIGHT YIELD (G) | | | | | | | | | | |
| 1:1 TOP RT | 0.00116 | 0.00069 | 0.0019 | 0.000616 | 0.000539 | 0.00239 | 0.00347 | 0.074 | | |
| 1:1 BOTTOM RT | 0.00054 | 0.0003 | 0.00052 | 0.00022 | 0.0016 | 0.00072 | 0.0011 | 0.028 | | |
| 1.25:1 TOP RT | 0.00168 | 0.000842 | 0.00243 | 0.000842 | 0.000792 | 0.00302 | 0.00431 | 0.095 | | |
| 1.25:1 BOTTOM RT | 0.00042 | 0.000228 | 0.0003 | 0.00014 | 0 | 0.000438 | 0.000595 | 0.026 | | |
| 1.5:1 TOP RT | 0.0015 | 0.000863 | 0.00247 | 0.000863 | 0.000805 | 0.00339 | 0.0036 | 0.083 | | |
| 1.5:1 BOTTOM RT | 0.00046 | 0.00021 | 0.00027 | 0.000114 | 0 | 0.000494 | 0.00063 | 0.026 | | |
| 1:1 TOP COLD*** | 0.00124 | 0.000639 | 0.00209 | 0.000604 | 0.000604 | 0.00256 | 0.0033 | 0.078 | | |
| 1:1 BOTTOM COLD | 0.00054 | 0.000343 | 0.00044 | 0.000172 | 0.000123 | 0.00064 | 0.00076 | 0.031 | | |
| 1.25:1 TOP COLD | 0.0015 | 0.000846 | 0.0025 | 0.00089 | 0.0008 | 0.00306 | 0.00409 | 0.1 | | |
| 1.25:1 BOTTOM COLD | 0.00043 | 0.00026 | 0.0003 | 0.000151 | 0.000108 | 0.000602 | 0.00043 | 0.0292 | | |
| 1.5:1 TOP COLD | 0.00129 | 0.000773 | 0.00227 | 0.000618 | 0.000773 | 0.00288 | 0.002884 | 0.083 | | |
| 1.5:1 BOTTOM COLD | 0.000336 | 0.00019 | 0.00019 | 0.000084 | 0 | 0.000336 | 0.00036 | 0.0242 | | |
| 82 PROOF CONTROL** | 0.00216 | 0.0011 | 0.00273 | 0.00111 | 0.00099 | 0.00393 | 0.00465 | 0.1344 | | |

*RT = ROOM TEMPERATURE
**82 PROOF CONTROL = 4 YEAR OLD MATURED OAK AGED WHISKY
***Cold = 20° F.

TABLE 2

6 HOUR EXTRACTION

| SAMPLE | GALLIC ACID | HMF | FURFURAL | SYRINGIC ACID | VANILLIN | STR. ALDEN | ELL. ACID | TANNINS | START WT(g) | FIN. WT. |
|---|---|---|---|---|---|---|---|---|---|---|
| 1. PPM | | | | | | | | | | |
| 1:1 TOP RT | 3.2 | 1.8 | 5.4 | 1.5 | 1.4 | 5.8 | 4.6 | 188 | 300 | 483 |
| 1:1 BOTTOM RT | 2.6 | 1.5 | 3.3 | 0.9 | 0.7 | 3.8 | 2.8 | 165 | 300 | 115 |
| 1.25:1 TOP RT | 3.3 | 1.6 | 5.2 | 1.4 | 1.4 | 6.2 | 5.7 | 174 | 375 | 519 |
| 1.25:1 BOTTOM RT | 2 | 1.2 | 2 | 0.6 | ND | 2.9 | 1.8 | 143 | 300 | 158 |
| 1.5:1 TOP RT | 2.9 | 1.5 | 4.7 | 1.2 | 1.4 | 5.2 | 4.8 | 158 | 450 | 596 |
| 1.5:1 BOTTOM RT | 1.8 | 1 | 1.5 | 0.2 | ND | 2.8 | 1.8 | 134 | 300 | 155 |
| 1:1 TOP COLD | 3.7 | 2 | 6.7 | 1.6 | 1.8 | 7.4 | 7.5 | 219 | 300 | 376 |
| 1:1 BOTTOM COLD | 1.8 | 1.2 | 1.5 | 0.5 | ND | 2.8 | 1.7 | 110 | 300 | 219 |
| 1.25:1 TOP COLD | 3.4 | 1.8 | 5.7 | 1.6 | 1.3 | 6.2 | 5.9 | 190 | 375 | 458 |
| 1.25:1 BOTTOM COLD | 1.7 | 1 | 1.2 | 0.3 | ND | 2.5 | 1.1 | 103 | 300 | 214 |

TABLE 2-continued

6 HOUR EXTRACTION

| SAMPLE | GALLIC ACID | HMF | FURFURAL | SYRINGIC ACID | VANILLIN | STR. ALDEN | ELL. ACID | TANNINS | START WT(g) | FIN. WT. |
|---|---|---|---|---|---|---|---|---|---|---|
| 1.5:1 TOP COLD | 2.8 | 1.6 | 5 | 1.4 | 1.4 | 5.4 | 5 | 155 | 450 | 537 |
| 1.5:1 BOTTOM COLD | 1.4 | 0.9 | 1 | 0.2 | ND | 1.6 | 1.3 | 108 | 300 | 218 |
| 82 PROOF | 7 | 3.5 | 9.6 | 3 | 2.6 | 12.2 | 11.6 | 363 | N/A | N/A |
| 2. WEIGHT YIELD (G) | | | | | | | | | | |
| 1:1 TOP RT | 0.0015456 | 0.23329 | 0.0026082 | 0.0007245 | 0.000676 | 0.0028014 | 0.0022218 | 0.090804 | | |
| 1:1 BOTTOM RT | 0.000299 | 0.01323 | 0.0003795 | 0.0001035 | 0.000081 | 0.000437 | 0.000322 | 0.081975 | | |
| 1.25:1 TOP RT | 0.0017127 | 0.26936 | 0.0026988 | 0.0007266 | 0.000727 | 0.0032178 | 0.0029583 | 0.090306 | | |
| 1.25:1 BOTTOM RT | 0.000316 | 0.02496 | 0.000316 | 0.0000948 | ND | 0.0004582 | 0.0002644 | 0.022594 | | |
| 1.5:1 TOP RT | 0.0017284 | 0.35622 | 0.0028012 | 0.0007152 | 0.000834 | 0.0030992 | 0.0028608 | 0.094168 | | |
| 1.5:1 BOTTOM RT | 0.000279 | 0.02403 | 0.0002325 | 0.000031 | ND | 0.000434 | 0.000279 | 0.02077 | | |
| 1:1 TOP COLD | 0.0013912 | 0.14138 | 0.0025192 | 0.0006016 | 0.000677 | 0.0027824 | 0.00282 | 0.082344 | | |
| 1:1 BOTTOM COLD | 0.0003942 | 0.04796 | 0.0003285 | 0.0001095 | ND | 0.0006132 | 0.0003723 | 0.02409 | | |
| 1.25:1 TOP COLD | 0.0015572 | 0.20976 | 0.0026106 | 0.0007328 | 0.000595 | 0.0028396 | 0.0027022 | 0.08702 | | |
| 1.25:1 BOTTOM COLD | 0.0003638 | 0.0458 | 0.0002568 | 0.0000642 | ND | 0.000535 | 0.0002354 | 0.022042 | | |
| 1.5:1 TOP COLD | 0.0015036 | 0.28837 | 0.002685 | 0.0007518 | 0.000752 | 0.0028998 | 0.002685 | 0.083235 | | |
| 1.5:1 BOTTOM COLD | 0.0003052 | 0.04752 | 0.000218 | 0.0000436 | ND | 0.0003488 | 0.0002834 | 0.023544 | | |
| 82 PROOF CONTROL | 0.0021 | 0.0011 | 0.00288 | 0.0009 | 0.00078 | 0.00366 | 0.00348 | 0.1089 | | |

TABLE 3

20 HOUR EXTRACTION

| SAMPLE | GALLIC ACID | HMF | FURFURAL | SYRINGIC ACID | VANILLIN | STR. ALDEN | ELL. ACID | TANNINS | START WT(g) | FIN. WT. |
|---|---|---|---|---|---|---|---|---|---|---|
| 1. PPM | | | | | | | | | | |
| 1:1 TOP RT | 3.2 | 1.8 | 5.4 | 1.3 | 1.3 | 5.9 | 6.5 | 184 | 300 | 500 |
| 1:1 BOTTOM RT | 2.4 | 1.6 | 3.1 | 0.9 | 0.8 | 4.3 | 3.6 | 170 | 300 | 105 |
| 1.25:1 TOP RT | 3 | 1.7 | 5.3 | 1.4 | 1.3 | 5.6 | 6.4 | 160 | 375 | 535 |
| 1.25:1 BOTTOM COLD | 2.2 | 1.2 | 2 | 0.5 | 0.2 | 2.7 | 2.8 | 152 | 300 | 145 |
| 1.5:1 TOP RT | 3.1 | 1.5 | 4.7 | 1.1 | 1.4 | 5.2 | 6.3 | 150 | 450 | 596 |
| 1.5:1 BOTTOM COLD | 2.1 | 1 | 1.4 | 0.5 | 0.2 | 2.5 | 2.1 | 134 | 300 | 150 |
| 1:1 TOP COLD | 4 | 2.1 | 7 | 1.6 | 1.8 | 7.8 | 8.4 | 218 | 300 | 385 |
| 1:1 BOTTOM COLD | 1.7 | 1.1 | 1.2 | 0.5 | ND | 2.4 | 1.2 | 106 | 300 | 220 |
| 1.25:1 TOP COLD | 3.5 | 1.8 | 6 | 1.6 | 1.6 | 7 | 7.3 | 196 | 375 | 460 |
| 1.25:1 BOTTOM COLD | 1.4 | 1 | 0.9 | ND | ND | 1.6 | 1.2 | 113 | 300 | 215 |
| 1.5:1 TOP COLD | 2.1 | 1.8 | 5.6 | 1.9 | 1.8 | 5.7 | 4.7 | 170 | 450 | 535 |
| 1.5:1 BOTTOM COLD | 1.3 | 0.5 | 0.5 | 0.3 | ND | 2 | 4.3 | 95 | 300 | 210 |
| 82 PROOF CONTROL | 7 | 3.5 | 9.8 | 2.8 | 2.5 | 12.3 | 11.4 | 350 | N/A | N/A |
| 2. WEIGHT YIELD (G) | | | | | | | | | | |
| 1:1 TOP RT | 0.0015 | 0.0009 | 0.0027 | 0.00065 | 0.00065 | 0.00295 | 0.00325 | 0.092 | | |
| 1:1 BOTTOM RT | 0.000252 | 0.000168 | 0.00033 | 0.000095 | 0.000084 | 0.000452 | 0.00038 | 0.0179 | | |
| 1.25:1 TOP RT | 0.00161 | 0.00091 | 0.00284 | 0.00075 | 0.000696 | 0.003 | 0.00342 | 0.086 | | |
| 1.25:1 BOTTOM RT | 0.00032 | 0.00017 | 0.003 | 0.000073 | 0.00003 | 0.00039 | 0.00041 | 0.022 | | |
| 1.5:1 TOP RT | 0.0019 | 0.0009 | 0.0028 | 0.00066 | 0.000834 | 0.0031 | 0.00376 | 0.09 | | |
| 1.5:1 BOTTOM RT | 0.00032 | 0.00015 | 0.00021 | 0.000075 | 0.00003 | 0.00038 | 0.00032 | 0.02 | | |
| 1:1 TOP COLD | 0.00154 | 0.00081 | 0.0027 | 0.00062 | 0.00069 | 0.0031 | 0.00323 | 0.084 | | |
| 1:1 BOTTOM COLD | 0.00037 | 0.000242 | 0.00026 | 0.00011 | 0 | 0.00053 | 0.000264 | 0.023 | | |
| 1.25:1 TOP COLD | 0.0016 | 0.00083 | 0.00276 | 0.00074 | 0.00074 | 0.00322 | 0.0034 | 0.09 | | |
| 1.25:1 BOTTOM COLD | 0.000301 | 0.00022 | 0.00019 | 0 | 0 | 0.00034 | 0.00026 | 0.024 | | |

TABLE 3-continued

20 HOUR EXTRACTION

| SAMPLE | GALLIC ACID | HMF | FURFURAL | SYRINGIC ACID | VANILLIN | STR. ALDEN | ELL. ACID | TANNINS | START WT(g) | FIN. WT. |
|---|---|---|---|---|---|---|---|---|---|---|
| 1.5:1 TOP COLD | 0.00112 | 0.000963 | 0.003 | 0.001017 | 0.000963 | 0.00305 | 0.00251 | 0.091 | | |
| 1.5:1 BOTTOM COLD | 0.000273 | 0.000105 | 0.00011 | 0.000063 | 0 | 0.00042 | 0.000903 | 0.01995 | | |
| 82 PROOF CONTROL | 0.0021 | 0.0011 | 0.00294 | 0.00084 | 0.00075 | 0.0037 | 0.00342 | 0.105 | | |

Discussion of Results

The data indicates that two hours is enough time for extraction to take place. There appears to be a greater recovery at 20 hours and at 20° F. for vanillin. However, at the longer extraction times, there is less of the higher mole weight flavor compounds. Six hours appears to be optimum. The colder temperature (20° F.) at a ratio of 1.5:1 for 6 hours are the preferred conditions. However, these conditions are not cost effective, therefore, 6 hours at 1.25:1 and at room temperature are more preferred.

EXAMPLE 4

Accelerated Whisky Maturation Method

Purpose

Use extraction method to extract flavors from an accelerated oak aged alcoholic concentrate produced by the accelerated whisky maturation method, to achieve a low cost flavor extract of vital whisky aroma and flavor compounds.

Procedure 5 liters of 125 proof whisky distillate was added to a 12 liter flask. 1000 g of medium toasted oak chips was added to the distillate (200 g/L ratio). The mixture was heated to 60° C. for 14 days, and oxygenated daily to 25 mg/l of $O_2$. The mixture was filtered to remove chips.

Analysis of the product (or accelerated oak aged alcoholic concentrate) (ppm):

| | | | |
|---|---|---|---|
| Gallic Acid | 22.1 | Solids | 16624 |
| HMF | 28.5 | Tannins | 6780 |
| Furfural | 91.6 | Acetic Acid | 491 |
| Syringic Acid | 94.2 | Fructose | 314 |
| Vanillin | 35.8 | Arabinose | 65 |
| Syringaldehyde | 205.2 | Ellagic Acid | 313.4 |

Extraction Method 1. 380 g of the accelerated oak aged alcoholic concentrate was weighed out into a 2 liter beaker.
2. 380 g of ethyl acetate was added, and the beaker was tightly covered with foil.
3. The mixture was stirred for 30 minutes on a Corning® stirplate at #5 setting.
4. The mixture was stored at −6 degree Celsius overnight.
5. The top solvent layer was removed at −6° C. as well as possible using decantation and pipettes. The top and bottom layers were collected to submit for chemical analysis. Weights and results are recorded in the following table:

{Reported in ppm}

| Liquid Layer | Gallic Acid | HMF[a] | Furfural | Syr Ald[b] | Vanillin | Syr Acid[c] | Ell Acid[d] | Weight(g) |
|---|---|---|---|---|---|---|---|---|
| Top | 22.0 | 14.0 | 35.4 | 26.4 | 28.0 | 83.2 | 148 | 465 |
| Bottom | 6.3 | 7.7 | 8.5 | 6.9 | 4.6 | 27.5 | 21.9 | 220 |
| Middle (emulsion) | 10.5 | 10.7 | 22.6 | 16.7 | 15.7 | 54.8 | 77.7 | 55 |

[a]HMF = 5 (hydroxy methyl) 2 - furaldehyde
[b]Syr Ald = syringaldehyde
[c]Syr Acid = syringic acid
[d]Ell Acid = ellagic acid
NOTE: The emulsion layer in this experiment was due to the elongated stirring time, the cold temperature during the extraction and possibly poor separation due to recovery from a graduated sylinder. Later studies use separatory funnels.

The top layer was first concentrated by heating on a combination stir hot plate until most of the ethyl acetate and alcohol (i.e., ethyl alcohol) appeared to have been evaporated into an atmosphere under a ventilation hood. The experiment started with approximately 275 grams of material and concentrated to a volume of approximately 40 grams. This extract was used in the following reconstitution in order to create a reconstituted whisky.

To prepare the reconstituted whisky, the following was used: to 1 liter of 80 proof grain neutral spirits, 5% weight to weight of the concentrated extract from above was added. Next 1 ml/l of an aldehyde essence prepared from a four year old whisky distillation was added to provide flavor top notes. The aldehyde essence was prepared by vacuum distilling 80 proof aged whisky. The preparation of the aldehyde essence started with 12,215 milliliters (mls) (11,148 gms) of four year old whisky and heated to 35 degrees C. under full vacuum (26.5 inches of Hg). After 1–2 hours there was collected 216 gms of distilled and condensed material classified as aldehyde essence. The addition of the aldehyde essence to the reconstituted whisky is not necessary, but it may be used, depending on the desired final product. A 500 ml portion of the above reconstituted whisky was split off to carbon treat it. 0.3 grams per liter of activated carbon from American Norit, Inc., Norit KB was used for the treatment. This was stirred for one hour and allowed to settle overnight. The material was filtered through a paper filter pad to produce a carbon treated finished product. The sample of carbon treated, reconstituted whisky was evaluated by a whisky taste panel and was deemed acceptable as a four year old mature oak aged whisky.

EXAMPLE 5

Accelerated Oak Aced Whisky Maturation Method with Extraction

Objective

To develop a process to prepare oak aged whisky flavors in the shortest possible amount of time.

Procedure 150 liters of 112 proof whisky distillate was added to a 250 liter vessel. 75000 grams of medium to dark toasted oak chips was added to achieve the standard ratio of 500 grams toasted oak chips per liter of whisky distillate. The mixture was heated to 60° C. Pure oxygen was sparged for fifteen minutes daily. A dissolved oxygen reading was usually taken before and after sparging everyday. Before sparging the dissolved oxygen reading was 0 mg/L. After sparging the readings ranged from 25–45 mg/l $O_2$.

After 14 days, the product was filtered. Analysis of the final product, i.e., accelerated oak aged alcoholic concentrate (PPM, unless noted otherwise):

| | | | |
|---|---|---|---|
| Gallic Acid | 12.4 | Solids | 12740 |
| HMF | 20.5 | Ethyl Acetate | 70 |
| Furfural | 60.3 | Tannins | 4360 |
| Syringic Acid | 68.7 | Glucose | 16 |
| Vanillin | 50.8 | Fructose | 138 |
| Syringaldehyde | 229.6 | Total Fusel Oil | 246.8 |
| Ellagic Acid | 225.8 | Acetic Acid | 29.2 |
| | | Alcohol | 112° |

Extraction Method 30 liters of the accelerated oak aged alcoholic concentrate from above was used. That concentrate was reduced to 80 proof with demineralized water.

37682 grams (83 pounds) of ethyl acetate was added to achieve a 1.25:1 rate ethyl acetate to the concentrate by volume.

The resulting mixture was mixed thoroughly, and let set for six hours at room temperature (21° C.). The mixture separated into a first and a second layer. The first layer was separated from the second layer by decantation.

There was recovered 50,500 g (111.2 pounds) of top layer and 17,200 g (37.88 pounds) bottom layer.

Concentration Step 18.2 liters of the top layer was put in a vacuum still. This was heated to 45° C. under 26 inches Hg. The volume was reduced to 4 liters yielding a concentrated extract.

Reconstituted Whisky Preparation

In this step, there was used 175 mL of the concentrated extract from above (4.5% ethyl alcohol), 644 mL GNS (having 190 proof), 931 mL deionized water, and 0.3 g whisky fusel oils (91%±3% fusel oil and 9%±3% water). The whisky fusel oils are obtained as a by-product of the production of grain neutral spirits.

The above ingredients were mixed and carbon treated with 0.3 g/L Norit Ultra C activated carbon. The product was filtered through a paper filter.

Sensory

The 10% concentrate (by volume) in 80 proof GNS with 200 ppm whisky fusel oil, i.e., reconstituted whisky, was submitted to a sensory panel for an acceptance test against a 4 year old mature oak aged whisky (i.e., mature oak aged alcoholic beverage). The test was conducted using 30 qualified whisky panelists. These panelists were trained utilizing the guidelines published in ASTM STP758. The acceptance test followed the guidelines published in ASTM STP433.

Acceptance Test

The control: 4 year old mature oak aged whisky; and the test (prepared above): accelerated oak aged whisky from concentrate (also referred to herein as the "reconstituted whisky"). The samples were not statistically significantly different on any taste panel sensory attribute. The taste panel did not find a significant difference on aroma, color, taste and smoothness between the two samples.

EXAMPLE 6

Flash Distillation

Flash distillation was used to concentrate the remainder of the top layer made in Example 5 to form a concentrated extract. This extract, when combined with a less costly alcoholic beverage, was intended to produce a product having characteristics of a mature oak aged alcoholic beverage. The following gives a brief overview of the process.

Apparatus and Method

1. A 12 L flask was arranged to accommodate a vacuum flash distillation.
2. In the set-up, a Masterflex pump was used to flow feed material through a coil submerged in a water bath. This feed passed through a fogger nozzle into the distillation flask.
3. The flask was placed into a heating mantle. The distillate was carried through a claisen head to a condenser. The distillate collected in a 2 L flask connected to vacuum via a second condenser.
4. An in-line cold vapor trap was inserted into the vacuum line, which was connected to a portable vacuum pump (full capability was approximately 26.5 inches Hg).

Methods

The process was a sequential step process:

Note: All volumes for residue and distillate collected are approximations.

| Step #1 | | | |
|---|---|---|---|
| Flash Tank: | 12 L | Condenser Temp = | 3 degrees C. |
| Receiver: | 2 L | Feed Temp = | 89 degrees C. |
| | | Vacuum = | ~26.5 inches Hg |
| | | Masterflex Pump Setting = | 2 |
| | Start volume: | | 1700 ml from Example 5 |
| | Residue volume: | | 1090 ml Feed for Step #2 |
| | Distillate volume: | | 610 ml |
| | Residue proof: | | 91 |
| | Distillate proof: | | 160 |

Note:
No heat was added to the flash tank. The starting material was filtered through a pressure filter pad to remove solids.

| Step #2 | | | |
|---|---|---|---|
| Flash Tank: | 12 L | Condenser Temp = | 3 degrees C. |
| Receiver: | 2 L | Feed Temp = | 90.5 degrees C. |
| | | Vacuum = | ~26.5 inches Hg |
| | | Masterflex Pump Setting = | 1.5 |
| Start volume: | | 1090 ml (residue from Step #1) | |
| Residue volume: | | 860 ml (feed for Step #3) | |
| Distillate volume: | | 230 ml | |
| Residue proof | | 40 | |
| Distillate proof: | | 142 | |

Notes: Flash tank temperature at beginning of the run was 37 degrees C. and at the end was 34 degrees C.

| Step #3 | | | |
|---|---|---|---|
| Flash Tank: | 12 L | Condenser Temp = | 3 degrees C. |
| Receiver: | 2 L | Feed Temp = | 92.2 degrees F. |
| | | Vacuum = | ~26.5" Hg |
| | | Masterflex Pump Setting = | 4-@ ⅓volume |
| | | | 3-@ ½volume |
| | | | 2-remainder run |
| Start volume: | | 860 ml residue from Step #2. | |
| Residue volume: | | 720 ml final volume of concentrated extract | |
| Distillate volume: | | 140 ml | |
| Residue proof | | 30 (approximate) | |
| Distillate proof: | | 70.8 | |

Notes:
The residue from Step #2 was used as the starting material. The beginning flash tank temperature was at 48 degrees C. and the end temperature was 40 degrees C.

Analysis

The following is the High Pressure Liquid Chromatography (HPLC) analysis for the final concentrated residue from Step #3:

Numbers are reported as ppm:

| Gallic Acid | 30.7 | Acetic Acid | 780 |
|---|---|---|---|
| HMF | 52.8 | Glucose | ND* |
| Furfural | 57.2 | Fructose | 506 |
| Syringic Acid | 191 | Arabinose | ND* |
| Vanillin | 135 | Tannins | 6310 |
| Syringaldehyde | 626 | Solids | 29180 |
| Ellagic Acid | 95.9 | Alcohol | 15% |

Based on the volumes for recovered distillate and residue, there was an approximate 60% concentration from the original starting material. 5% of the concentrated extract was added to 80 proof grain neutral spirits. The beverage was evaluated by a whisky panel and deemed to be acceptable as a mature oak aged whisky. This indicates that flash concentration process can be used to remove ethyl acetate and, therefore this process can be used to produce a whisky extract.

EXAMPLE 7

Accelerated Oak Aged Alcoholic Beverage Production

Objective

To develop a process to prepare an accelerated oak aged alcoholic beverage (having attributes of a mature oak aged whisky) in the shortest amount of time possible.

Procedure 8640 ml of 125 proof whisky distillate was added to 3360 ml of deionized water in a 12 liter round flask. This gave a total of 12 liters of 90 proof whisky distillate. 180 grams of medium to dark toasted oak chips was added to achieve the standard ratio of 15 grams toasted oak chips per liter. The mixture was set in a water bath with a temperature of 50° C. Pure oxygen was sparged for fifteen minutes daily. A dissolved oxygen reading was usually taken before and after sparging everyday (25–45 mg/l oxygen). This product was filtered after 9 days and the filtrate had a color of 17.4 lovibond.

Analysis of final product (reported in ppm):

| Gallic Acid | 2.8 | Acetaldehyde | 0.02 |
|---|---|---|---|
| HMF | 3.3 | Ethyl Acetate | 0.7 |
| Furfural | 7.5 | n-Propanol | 1.4 |
| Syringic Acid | 5.2 | Isobutanol | 6.5 |
| Vanillin | 8.6 | Isoamyl Alcohol | 17.6 |
| Syringaldehyde | 24.8 | Total Fusel Oil | 25.6 |
| Ellagic Acid | 255.8 | Alcohol Content | 45% (90 proof) |

After chemical analysis and prior to a sensory evaluation, the product was reduced to 80 proof and carbon treated with Norit Ultra C at a level of 0.3 gram/proof gallon to achieve substantially the same color as the Early Times® aged whisky. The mixture was filtered and submitted to an expert whisky sensory panel. The expert whisky sensory panel considered the product to be equal to Early Times® aged whisky.

EXAMPLE 8

Accelerated Oak Aged Whisky Maturation Method

An accelerated oak aged alcoholic concentrate is prepared by adding 150 L of 112 proof alcoholic (whisky) distillate to a 250 L vessel. About 45,000 grams of medium to dark toasted oak chips is then added to achieve a ratio of 300 grams of toasted oak chips per liter of whisky distillate. The mixture is then heated to 60° C. Pure oxygen is sparged for fifteen minutes daily. A dissolved oxygen reading is taken before and after sparging everyday. Before sparging, the dissolved oxygen reading is 0 mg/L. After sparging, the dissolved oxygen readings range from 25–45 mg/l $O_2$.

After about 14 days, the product is filtered. Analysis of the final product, i.e., accelerated oak aged alcoholic concentrate reveals the following (PPM, unless noted otherwise):

| Gallic Acid | 2.3 |
|---|---|
| Solids | 17590 |
| HMF | 32.1 |
| Ethyl Acetate | 13.4 |
| Furfural | 97.2 |
| Tannins | 6758 |
| Syringic Acid | 92.8 |
| Glucose | 0 |
| Vanillin | 52.5 |
| Fructose | 162 |
| Syringaldehyde | 241 |
| Total Fusel Oil | 197.3 |
| Ellagic Acid | 261 |
| Acetic Acid | 36.8 |
| Alcohol | 112° |

Filtration

Then, about 64.3 L of accelerated oak-aged alcoholic concentrate from above is used. The accelerated oak aged alcoholic concentrate is diluted to 96 proof with demineralized water and 1.5 gm/L, diatomaceous earth is added and the reduced proof concentrate is filtered through a 0.5 micron Cellulo filter pad number 755.

Proof Reduction

About 11.4 L from the above filtrate is reduced in proof with deminarilized water to 58°.

Flash Evaporation

The flash evaporation is conducted in a simple stage flash evaporator, including one nozzle, and is conducted at the conditions identified below to obtain the alcohol level in the concentrate set forth below.

| Parameters | |
|---|---|
| Feed temperature | 37° C. |
| Wall temperature | 25° C. |
| Vapor temperature | 30° C. |
| Vacuum | 28 inches Hg. |
| Feed Pressure | 30 PSIG |
| Flow Rate | 22.7 L/hr |

About 13.2 L of 58 proof of the accelerated oak aged alcoholic concentrate is processed.

About 2.6 L of the concentrate and 10 L of distillate are recovered. About 0.6 L is lost during processing.

Results

The following results are obtained. All values are ppm unless otherwise stated.

| Component | Feed @ 58° | Concentrate | Distillate |
|---|---|---|---|
| Gallic Acid | 14.68 | 61.2 | ND* |
| HMF | 21.8 | 97.4 | ND |
| Furfural | 65.9 | 13.1 | ND |
| Syrginic Acid | 184.88 | 210 | ND |
| Vanillin | 41.81 | 133 | ND |
| Syringaldehyde | 84.58 | 557 | ND |
| Ellagic Acid | 172.8 | 354 | ND |
| Glucose | ND | ND | ND |
| Fructose | 149.83 | 846 | ND |
| Arabinose | ND | ND | ND |
| Acetic Acid | 283.96 | 538 | 180 |
| Solids | 12705.6 | 35915 | 14 |
| Tannins | 5984.3 | 8872 | ND |
| Alcohol | 29% | 2.9% | 35.9% |

*ND = not determined

Sensory

Two samples are then submitted at 5% and 7% concentrate in 80° GNS plus 200 ppm fusel oils. These samples are compared against 4 year old matured oak aged whisky (control).

The 5% sample is liked overall, while the 7% sample is preferred with respect to aftertaste. Both samples are found to be not significantly different from the control in any attributes. Both samples are ranked as "about right" with respect to color and alcohol level. The two samples are ranked between "slightly low" and "slightly high" with respect to whiskey flavor intensity.

EXAMPLE 9

Flash Concentration

About 13.2 L of filtered material from Example 8 are processed in the same apparatus as Example 8. (This material is not reduced to 58 proof prior to the flash).

| Parameters | |
|---|---|
| Feed temperature | 59° C. |
| Vapor temperature | 33° C. |
| Vacuum | 27.5 inches Hg. |
| Feed pressure | 30 PSIG |
| Flow rate | 26 L/hr |

About 1.2 L concentrate and about 7.6 L distillate are recovered. About 3 L is lost during processing.

The following results are achieved. All values are ppm unless otherwise indicated.

| Component | Distillate | Concentrate |
|---|---|---|
| Gallic Acid | ND | 33.0 |
| HMF | 2.1 | 51.5 |
| Furfural | 74.6 | 23.0 |
| Syringic Acid | 3.5 | 150 |
| Vanillin | 5.2 | 97.0 |
| Syringaldehyde | 16.4 | 460 |
| Ellagic Acid | 14.1 | 255 |
| Alcohol | 49% | 7.4% |

Sensory

A 5% concentrate in 80 proof GNS with 200 ppm Whiskey Fusel Oil is evaluated against 80 proof 4 year old matured oak aged whisky (control). The product is the same as the control.

It is observed that this process of Example 9 provides similar results as Example 8, except that the concentrate alcohol level is 7.4% compared to a preferred concentrate alcohol level of less than 5%.

EXAMPLE 10

Preparation of Extract Without Food Grade Solvent

In this example, four different samples of an accelerated oak aged alcoholic concentrate are used. Each sample is prepared substantially in the same manner as in Example 8, i.e., heating and aerating and/or oxygenating a mixture of an alcoholic distillate and 300 g/l toasted oak chips for about 14 days at 60° C. The four samples have the following proof levels: 105°; 110°; 115°; and 120°. Each sample is filtered through a Cellulo 755 filter pad (pore size 0.5 microns). Each sample is flashed in a one stage flash apparatus, including a preheater kept at 91° C., and a reaction flask maintained at 38° C. under a vacuum of 25 in Hg. The resulting concentrate remaining in the flask is then reconstituted in an 80 proof GNS mixture using 5% of the concentrate.

The resulting four reconstituted whiskey samples are submitted to a whiskey discrimination panel which compares them to a conventionally-matured oak aged alcoholic beverage (i.e., 4 year old matured oak aged whiskey), used as a control. The results indicated that:

the 105° sample compared very favorably to the control;
the 110° sample compared also favorably but not quite as favorably as the 105° sample;
the 115° and 120° samples had an overly woody taste and were deemed not acceptable.

The results suggest that increasing alcohol level of the initial starting material used to make an extract may increase the wood/bourbon notes of the extract.

The process and products of the present invention provide significant advantages.

The accelerated whisky maturation method may produce in a relatively short time an accelerated oak aged alcoholic beverage, a relatively inexpensive product which has substantially the same sensory and taste characteristics as mature oak aged alcoholic beverages. This method may also produce an accelerated oak aged alcoholic concentrate which may be used for making an extract. This method preserves natural resources and is relatively environmentally sound.

The extract produced by the process for making the extract can be used to make an alcoholic beverage suitable for human consumption having substantially the same flavor characteristics as a mature oak aged alcoholic beverage at a substantially reduced cost due to relatively low production costs and elimination of a substantial portion of transportation costs and excise taxes. The method of preparation of the extract is relatively simple and inexpensive and can be carried out with substantially standard equipment readily available in most industrialized countries.

The method of use of the extract is also relatively simple and can be carried out with substantially standard equipment and techniques.

Of course, it should be understood that a wide range of changes and modifications can be made to the preferred embodiments described above. It is, therefore, intended that the foregoing description be regarded as illustrative rather than limiting and that it be understood that it is the following claims, including all equivalents, which are intended to define the scope of this invention.

What is claimed is:

1. A process of making a concentrated extract of an accelerated oak aged alcoholic concentrate, wherein the concentrate has proof of about 80° to about 120° and comprises water and vanillin, and wherein the concentrated extract comprises water, about 0% wt. to about 40% wt. of alcohol and about 80 ppm to about 130 ppm of vanillin, said process comprising the steps of:
   (i) producing said accelerated oak aged alcoholic concentrate by a subprocess comprising the steps of:
      (a) combining an alcoholic distillate with more than about 100 grams of toasted oak chips per liter of the alcoholic distillate to provide a mixture of alcoholic distillate and toasted oak chips;
      (b) heating and aerating and/or oxygenating the mixture for about 5 to about 40 days; and
      (c) removing the toasted oak chips from said mixture to form said concentrate;
   (ii) treating said accelerated oak aged alcoholic concentrate by filtration or activated carbon treatment to produce an intermediate product; and
   (iii) concentrating the intermediate product by evaporation, distillation, vacuum distillation, flash evaporation, thin film evaporation, or wipe film evaporation to produce said concentrated extract.

2. The process according to claim 1, wherein the concentrate has proof of about 90° to about 115°.

3. The process according to claim 1, wherein the concentrate has proof of about 95° to about 110°.

4. The process according to claim 1, wherein the extract comprises about 0 to about 10% wt. alcohol.

5. The process according to claim 1, wherein the extract comprises about 0 to about 5% wt. alcohol.

6. The process according to claim 1, wherein the extract comprises about 3% wt. alcohol.

7. The process according to claim 1, wherein extract further comprises one or more members of the group consisting of isopentyl alcohol, active amyl alcohol, isobutyl alcohol, normal propyl alcohol, oak lactones, tannins, esters and aldehydes.

8. The process according to claim 1, wherein said treating in step (ii) comprises filtration.

9. The process according to claim 8, wherein said filtration comprises passing the concentrate through a filter having a pore size of about 0.5 to about 0.7 micron.

10. The process according to claim 1, wherein said concentrating is by flash evaporation, and said flash evaporation is a single stage flash evaporation under vacuum at 29° C.

11. The process according to claim 1, wherein in said step (i)(a) the alcoholic distillate is combined with about 100 to about 500 grams of the toasted oak chips per liter of the alcoholic distillate.

* * * * *